United States Patent
Liu et al.

(10) Patent No.: US 10,839,131 B2
(45) Date of Patent: *Nov. 17, 2020

(54) THREE-DIMENSIONAL MASK MODEL FOR PHOTOLITHOGRAPHY SIMULATION

(71) Applicant: ASML NETHERLANDS B.V., Veldhoven (NL)

(72) Inventors: Peng Liu, Sunnyvale, CA (US); Yu Cao, Saratoga, CA (US); Luoqi Chen, Saratoga, CA (US); Jun Ye, Palo Alto, CA (US)

(73) Assignee: ASML Netherlands B.V., Veldhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/265,367

(22) Filed: Feb. 1, 2019

(65) Prior Publication Data
US 2019/0163866 A1 May 30, 2019

Related U.S. Application Data

(63) Continuation of application No. 15/174,732, filed on Jun. 6, 2016, now Pat. No. 10,198,549, which is a (Continued)

(51) Int. Cl.
*G06F 17/50* (2006.01)
*G03F 1/00* (2012.01)
(Continued)

(52) U.S. Cl.
CPC .............. *G06F 30/398* (2020.01); *G03F 1/50* (2013.01); *G03F 1/76* (2013.01); *G03F 7/705* (2013.01);
(Continued)

(58) Field of Classification Search
None
See application file for complete search history.

(56) References Cited

U.S. PATENT DOCUMENTS

| 7,003,758 B2 | 2/2006 | Ye et al. |
| 7,294,437 B2 | 11/2007 | Liu et al. |

(Continued)

OTHER PUBLICATIONS

Adam, et al., "Domain Decomposition Methods for the Rapid Electromagnetic Simulation of Photomask Scattering", J. Microlith., Microfab. Microsyst., vol. 1, No. 3, Oct. 2002, pp. 253-269.
(Continued)

*Primary Examiner* — Leigh M Garbowski
(74) *Attorney, Agent, or Firm* — Pillsbury Winthrop Shaw Pittman LLP

(57) ABSTRACT

A three-dimensional mask model that provides a more realistic approximation of the three-dimensional effects of a photolithography mask with sub-wavelength features than a thin-mask model. In one embodiment, the three-dimensional mask model includes a set of filtering kernels in the spatial domain that are configured to be convolved with thin-mask transmission functions to produce a near-field image. In another embodiment, the three-dimensional mask model includes a set of correction factors in the frequency domain that are configured to be multiplied by the Fourier transform of thin-mask transmission functions to produce a near-field image.

21 Claims, 9 Drawing Sheets

Related U.S. Application Data continuation of application No. 14/600,337, filed on Jan. 20, 2015, now Pat. No. 9,372,957, which is a continuation of application No. 14/081,386, filed on Nov. 15, 2013, now Pat. No. 8,938,694, which is a continuation of application No. 13/736,929, filed on Jan. 8, 2013, now Pat. No. 8,589,829, which is a continuation of application No. 12/721,343, filed on Mar. 10, 2010, now Pat. No. 8,352,885, which is a continuation of application No. 11/838,582, filed on Aug. 14, 2007, now Pat. No. 7,703,069.

(51) Int. Cl.
*G06F 30/398* (2020.01)
*G03F 7/20* (2006.01)
*G06F 30/30* (2020.01)
*G03F 1/76* (2012.01)
*G03F 1/50* (2012.01)
*G03F 1/36* (2012.01)
*G06F 30/20* (2020.01)
*G06F 30/39* (2020.01)
*G06F 30/337* (2020.01)
*G06F 119/18* (2020.01)

(52) U.S. Cl.
CPC .............. *G06F 30/30* (2020.01); *G03F 1/144* (2013.01); *G03F 1/36* (2013.01); *G06F 30/20* (2020.01); *G06F 30/337* (2020.01); *G06F 30/39* (2020.01); *G06F 2119/18* (2020.01)

(56) References Cited

U.S. PATENT DOCUMENTS

| | | | |
|---|---|---|---|
| 7,587,704 | B2 | 9/2009 | Ye et al. |
| 7,603,648 | B2 | 10/2009 | Liu et al. |
| 7,615,319 | B2 | 11/2009 | Liu et al. |
| 7,703,069 | B1 | 4/2010 | Liu et al. |
| 7,921,383 | B1 | 4/2011 | Wei |
| 7,921,387 | B2 | 4/2011 | Wei |
| 8,078,995 | B2 | 12/2011 | Tirapu Azpiroz et al. |
| 8,352,885 | B2 | 1/2013 | Liu et al. |
| 8,589,829 | B2 | 11/2013 | Liu et al. |
| 8,918,743 | B1 | 12/2014 | Yan |
| 9,372,957 | B2 | 6/2016 | Liu et al. |
| 2005/0015233 | A1 | 1/2005 | Gordon |
| 2007/0061772 | A1 | 3/2007 | Ye et al. |

OTHER PUBLICATIONS

Adam, et al., "Simplified Models for Edge Transitions in Rigorous Mask Modeling", Proc. of SPIE, vol. 4346, pp. 331-344 (2001).
Bai, et al., "Approximation of Three Dimensional Mask Effects with Two Dimensional Features", Proc. of SPIE, vol. 5751, pp. 446-454 (2005).
Born, et al., "Principles of Optics", 7$^{th}$ (expanded) ed., *Electromagnetic theory of Propagation, Interference and Diffraction of Light*, pp. 598-607 (1999).
Burger, et al., "Rigorous Simulation of 3D Masks", Proc. of SPIE, vol. 6349, pp. 1-8 (2006).
Cao, et al,, "Optimized hardware and Software for Fast, Full Chip Simulation", Proc. of SPIE, vol. 5754, p. 407 (2005).
Cobb, et al., "Fast Optical and Process Proximity Correction Algorithms for Integrated Circuit Manufacturing", Ph.D. Dissertation, Univ. of California Berkeley, Spring 1998, 139 pages.
Erdmann, et al., "Mask and Wafer Topography Effects in Immersion Lithography", Proc. of SPIE, vol. 5754, pp. 383-394 (2005).
Estroff, et al., "Mask-induced Polarization Effects at High Numerical Aperture", J. Microlith, Microfab., Microsys., Jul.-Sep. 2005, vol. 4(3), pp. 031107-1 to 031107-8.
Flagello, et al., "Polarization Effects Associated with Hyper Numerical Aperture (>1) Lithography", J. Microlith, Microfab., Microsys., Jul.-Sep. 2004, 4(3), pp. 031104-1 to 031104-17.
Lam, et al., "Domain Decomposition Methods for Simulation of Printing and Inspection of Phase Defects", Proc. of SPIE, vol. 5040, pp. 1492-1501 (2003).
Lee, et al., "Mask Topography Effect on OPC at Hyper NA Lithography," Proc. of SPIE, vol. 6154, pp. 1-8 (2006).
Li, et al. "Metropole-3D: A Rigorous 3D Topography Simulator", Proc of SPIE, vol. 3334, pp. 717-728 (1998).
Mack, et al., "The Impact of Attenuated Phase Shift Mask Topography on Hyper-NA Lithography", Proc. of SPIE, vol. 5992, pp. 1-11 (2005).
Martin, et al., "Exploring New High Speed, Mask Aware RET Verification Flows", Proc. of SPIE, vol. 5853, pp. 114-123 (2005).
Philipsen, et al., "Mask Topography Effect in Chromeless Phase Lithography", Proc. of SPIE, vol. 5567, pp. 669-679 (2004).
Pistor, et al., "Modeling Oblique Incidence Effects in Photomaks", Proc. of SPIE, vol. 4000, pp. 228-237 (2000).
Pistor, et al., "Rigorous 3D Simulation of Phase Defects in Alternating Phase Shifting Masks", Proc. of SPIE, vol. 4562, pp. 1038-1050 (2002).
Spence, et al., "Full Chip Lithography Simulation and Design Analysis How OPC is changing IC Design", Proc. of SPIE, vol. 5751, pp. 1-14 (2005).
Tirapu-Azpiroz, et al., "Boundary Layer Model to Account for Thick Mask Effects in Photolithography", Proc. of SPIE, vol. 5040, pp. 1611-1619 (2003).
Wong, et al., "Examination of Polarization and Edge Effects in Photolithographic Masks Using Three-Dimensional Rigorous Simulation", Proc of SPIE, vol. 2197, pp. 521-528 (1994).
Wong, et al., "Mask Topography Effects in Projection Printing of Phase Shifting Masks", IEEE Transactions on Electron Devices, vol. 41, No. 6, Jun. 1994, pp. 895-902.
Yeung, et al., "Fast and Rigorous Three-Dimensional Mask Diffraction Simulation Using Battle Lemarie Wavelet Based Multiresolution Time Domain Method", Proc. of SPIE, vol. 5040, pp. 69-77 (2003).
Yeung, et al., "Limitation of the Kirchoff Boundary Conditions for Aerial Image Simulation in 157-nm Optical Lithography", IEEE Electron Device Letters, vol. 21, No. 9, Sep. 2000, pp. 433-435.
Laird et al., "Optimization of an x-ray mask design for use with horizontal and vertical kinetic mounts," Proc. of SPIE, vol. 1465, pp. 134-144 (1991).
Kirchauer et al., "Rigorous Three-Dimensional Photoresist Exposure and Development Simulation over Nonplanar Topography," IEEE Trans. on CAD of ICs and Systems, vol. 16, No. 12, Dec. 1997, pp. 1431-1438.
Liu et al., "Fast and accurate 3D mask model for full-chip OPC and verification," Proc. of SPIE, vol. 6520, 12 pages (Feb. 2007).
Saied et al., "Three-dimensional mask effects and source polarization impact on OPC model accuracy and process window," Proc. of SPIE, vol. 6520, 12 pages (2007).
Evanschitzky et al., "Three dimensional EUV simulations—A new mask near field and imaging simulation system," Proc. of SPIE, vol. 5992, 9 pages (2005).
Erdmann, "Process Optimization Using Lithography Simulation," Proc. of SPIE, vol. 5401, pp. 22-36 (2003).
Gordon, "Exact Computation of Scalar, 2D Aerial Imagery," Proc. of SPIE, vol. 4692, pp. 517-528 (2002).
Fuard et al., "Validity of the Diffused Aerial Image Model: an Assessment Based on Multiple Test Cases," Proc. of SPIE, vol. 5040, pp. 1536-1543 (2003).
Wong et al., "Rigorous Three-Dimensional Time-Domain Finite-Difference Electromagnetic Simulation for Photolithographic Applications," IEEE Trans. on Semiconductor Manufacturing, vol. 8, No. 4, Nov. 1995, pp. 419-431.
Adam, "Modeling of Electromagnetic Effects from Mask Topography at Full-Chip Scale," Proc. of SPIE vol. 5754 (2005).
Zhu et al., "METROPOLE-3D: A Three-Dimensional Electromagnetic Field Simulator for EUV Masks under Oblique Illumination," Proc. of SPIE, vol. 5256, pp. 585-594 (2003).

(56) References Cited

OTHER PUBLICATIONS

Wei et al., "3D Rigorous Simulation of Mask Induced Polarization," Proc. of SPIE, vol. 5754, pp. 567-575 (2005).
Estroff et al., "Mask induced polarization," Proc. of SPIE, vol. 5377, pp. 1069-1080 (2004).
Smaali et al., "Three-dimensional Rigorous Simulation of EUV Defective Masks Using Model Method by Fourier Expansion," Proc. of SPIE, vol. 6151, 10 pages (2006).
Erdmann et al., "Validity of the Hopkins approximation in simulations of hyper NA (NA>1) line-space structures for an attenuated PSM mask," Proc. of SPIE, vol. 6154, 12 pages (2006).
Moharam et al., "Rigorous coupled-wave analysis of planar-grating diffraction," JOSA, vol. 71, No. 7, pp. 811-818 (Jul. 1981).
Liu, P., et al., "Fast 3D thick mask model for full-chip EUVL simulations", Proc. of SPIE, vol. 8679 (2013).

THREE-DIMENSIONAL MASK MODEL FOR PHOTOLITHOGRAPHY SIMULATION

This application is a continuation of U.S. patent application Ser. No. 15/174,732, filed Jun. 6, 2016, which is a continuation of U.S. patent application Ser. No. 14/600,337, filed Jan. 20, 2015, now U.S. Pat. No. 9,372,957, which is a continuation of U.S. patent application Ser. No. 14/081,386, filed Nov. 15, 2013, now U.S. Pat. No. 8,938,694, which is a continuation of U.S. patent application Ser. No. 13/736,929, filed Jan. 8, 2013, now U.S. Pat. No. 8,589,829, which is a continuation of U.S. patent application Ser. No. 12/721,343, filed Mar. 10, 2010, now U.S. Pat. No. 8,352,885, which is a continuation of U.S. patent application Ser. No. 11/838,582, filed Aug. 14, 2007, now U.S. Pat. No. 7,703,069, each of the foregoing applications is incorporated herein by reference in its entirety.

FIELD

This invention relates generally to simulating photolithography processes and relates more particularly to methods for three-dimensional mask modeling.

BACKGROUND

The integrated circuit industry has, since its inception, maintained a remarkable growth rate by driving increased device functionality at lower cost. One of the primary enabling factors of this growth has been the ability of optical lithography to steadily decrease the smallest feature size that can be formed as part of the integrated circuit pattern. The steady decline in feature size and cost and the corresponding increase in the density of features printed per circuit are commonly referred to as "Moore's Law" or the lithography "roadmap."

The lithography process involves creating a master image on a mask or reticle (mask and reticle are used interchangeably herein), then projecting an image from the mask onto a resist-covered substrate in order to create a pattern that matches the design intent of defining functional elements, such as transistor gates, contacts, etc., on the device wafer. The more times a master pattern is successfully replicated within the design specifications, the lower the cost per finished device or "chip" will be. Until recently, the mask pattern has been an almost exact duplicate of the desired pattern at the wafer level, with the exception that the mask level pattern may be several times larger than the wafer level pattern, due to an imaging reduction ratio of the exposure tool. The mask pattern is typically formed by depositing and patterning a light-absorbing material on quartz or another transparent substrate. The mask is then placed in an exposure tool known as a "stepper" or "scanner" where light of a specific exposure wavelength is directed through the mask onto the wafers. The light is transmitted through clear areas of the mask, but is attenuated by a desired amount, typically between 90 and 100%, in the areas covered by the absorbing layer. The light that passes through some regions of the mask may also be phase shifted by a desired phase angle, typically an integer multiple of 180 degrees. After being collected by the projection optics of the exposure tool, the resulting aerial image pattern is then focused onto the wafers. A light-sensitive material (photoresist or resist) deposited on the wafer surface interacts with the light to form the desired pattern on the wafer, and the pattern is then transferred into the underlying layers on the wafer to form functional electrical circuits according to well-known processes.

In recent years, the feature sizes being patterned have become significantly smaller than the wavelength of light used to transfer the pattern. This trend towards "subwavelength lithography" has resulted in increasing difficulty in maintaining adequate process margins in the lithography process. The aerial images created by the mask and exposure tool lose contrast and sharpness as the ratio of feature size to wavelength decreases. This ratio is quantified by the k1 factor, defined as the numerical aperture of the exposure tool times the minimum feature size divided by the wavelength. There is limited practical flexibility in choosing the exposure wavelength, while the numerical aperture of exposure tools is approaching physical limits. Consequently, the continuous reduction in device feature sizes requires more and more aggressive reduction of the k1 factor in lithographic processes, i.e. imaging at or below the classical resolution limits of an optical imaging system.

Methods to enable low-k1 lithography have used master patterns on the mask that are no longer exact copies of the final wafer level pattern. The mask pattern is often adjusted in terms of the size and placement of features as a function of pattern density or pitch. Other techniques involve the addition or subtraction of extra corners on the mask features ("serifs," "hammerheads," and other patterns) and the addition of other geometries that are not intended to be printed on the wafer at all. These non-printing "assist features," the sole purpose of which is to enhance the printability of the "main features," may include scattering bars, holes, rings, checkerboards or "zebra stripes" to change the background light intensity ("gray scaling"), and other structures that are well documented in the literature. All of these methods are often referred to collectively as "Optical Proximity Correction" or OPC. With decreasing k1, the magnitude of proximity effects increases dramatically. In current high-end designs, more and more device layers require OPC, and almost every feature edge requires some amount of adjustment in order to ensure that the printed pattern will reasonably resemble the design intent. The implementation and verification of such extensive OPC application is only made possible by detailed full-chip computational lithography process modeling, and the process is generally referred to as model-based OPC. (See "Full-Chip Lithography Simulation and Design Analysis—How OPC Is Changing IC Design," C. Spence, Proc. SPIE, Vol.5751, pp. 1-14 (2005) and "Exploring New High Speed, Mask Aware RET Verification Flows," P. Martin et al., Proc. SPIE 5853, pp. 114-123, (2005)).

The mask may also be altered by the addition of phase-shifting regions which may or may not be replicated on the wafer. A large variety of phase-shifting techniques has been described at length in the literature including alternating aperture shifters, double expose masking processes, multiple phase transitions, and attenuating phase shifting masks. Masks formed by these methods are known as "Phase-Shifting Masks," or PSMs. All of these techniques to increase the normalized image log slope (NILS) at low k1, including OPC, PSM and others, are referred to collectively as "Resolution Enhancement Technologies," or RET. The result of all of these RETs, which are often applied to the mask in various combinations, is that the final pattern formed at the wafer level is no longer a simple replicate of the mask level pattern. In fact, it is becoming impossible to simply look at the mask pattern and determine what the final wafer pattern is supposed to look like. This greatly increases the difficulty in verifying that the design data is correct before the mask is made and wafers exposed, as well as verifying that the RETs have been applied correctly and the mask meets its target specifications.

The cost of manufacturing advanced mask sets is steadily increasing. Currently, the cost has already exceeded one million dollars per mask set for an advanced device. In addition, the turn-around time is always a critical concern. As a result, computer simulations of the lithography process, which assist in reducing both the cost and turn-around time, have become an integral part of semiconductor manufacturing. A fast and accurate approach has been described in U.S. Pat. No. 7,003,758, entitled "System and Method for Lithography Simulation," the subject matter of which is hereby incorporated by reference in its entirety, and is referred to herein as the "lithography simulation system."

As shown in FIG. 1, a lithography simulation process typically consists of several functional steps. First, a design layout that describes the shapes and sizes of patterns that correspond to functional elements of a semiconductor device, such as diffusion layers, metal traces, contacts, and gates of field-effect transistors, is created. These patterns represent the "design intent" of physical shapes and sizes that need be reproduced on a wafer by the lithography process in order to achieve certain electrical functionality and specifications of the final device.

As described above, numerous modifications to this design layout are required to create the patterns on the mask or reticle used to print the desired structures. A variety of RET methods are applied to the design layout in order to approximate the design intent in the actually printed patterns. The resulting "post-RET" mask layout differs significantly from the "pre-RET" design layout. Both the pre- and post-RET layouts may be provided to the simulation system in a polygon-based hierarchical data file in, e.g., the GDS or the OASIS format.

The actual mask will further differ from the geometrical, idealized, and polygon-based mask layout because of fundamental physical limitations as well as imperfections of the mask manufacturing process. These limitations and imperfections include, e.g., corner rounding due to finite spatial resolution of the mask writing tool, possible line-width biases or offsets, and proximity effects similar to the effects experienced in projection onto the wafer substrate. The true physical properties of the mask may be approximated in a mask model to various degrees of complexity as described in U.S. Pat. No. 7,587,704. Mask-type specific properties, such as attenuation, phase-shifting design, etc., need be captured by the mask model. The lithography simulation system described in U.S. Pat. No. 7,003,758 may, e.g., utilize an image/pixel-based grayscale representation to describe the actual mask properties.

One of the most important inputs to any lithography simulation system is the model for the interaction between the illuminating electric field and the mask. The thin-mask approximation is widely used in most lithography simulation systems. The thin-mask approximation, also called the Kirchhoff boundary condition, assumes that the thickness of the structures on the mask is very small compared with the wavelength and that the widths of the structures on the mask are very large compared with the wavelength. Therefore, the thin-mask approximation assumes the electro-magnetic field after mask is the multiplication of the incident field with the mask transmission function. That is, the mask transmits light in an ideal way, different regions on the mask transmit the electric field with the ideal transmittance and phase, and the transition region between different types of structures is a step function. The advantages of the thin-mask model are simple, fast, and reasonably accurate calculations for feature sizes much larger than the source wavelength.

A central part of lithography simulation is the optical model, which simulates the projection and image forming process in the exposure tool. The optical model needs to incorporate critical parameters of the illumination and projection system: numerical aperture and partial coherence settings, illumination wavelength, illuminator source shape, and possibly imperfections of the system such as aberrations or flare. The projection system and various optical effects, e.g., high-NA diffraction, scalar or vector, polarization, and thin-film multiple reflection, may be modeled by transmission cross coefficients (TCCs). The TCCs may be decomposed into convolution kernels, using an eigen-series expansion. For computation speed, the series is usually truncated based on the ranking of eigen-values, resulting in a finite set of kernels. The more kernels are kept, the less error is introduced by the truncation. The lithography simulation system described in U.S. Pat. No. 7,003,758 allows for optical simulations using a very large number of convolution kernels without negative impact on computation time and therefore enables highly accurate optical modeling. (See also "Optimized Hardware and Software for Fast, Full Chip Simulation," Y. Cao et al., Proc. SPIE Vol. 5754, 407 (2005)).

Further, in order to predict shapes and sizes of structures formed on a substrate, a resist model is used to simulate the effect of projected light interacting with the photosensitive resist layer and the subsequent post-exposure bake (PEB) and development process. A distinction can be made between first-principle simulation approaches that attempt to predict three-dimensional resist structures by evaluating the three-dimensional light distribution in resist, as well as microscopic, physical, or chemical effects such as molecular diffusion and reaction within that layer. On the other hand, all "fast" simulation approaches that may allow full-chip simulation currently restrict themselves to more empirical resist models that employ as an input a two-dimensional aerial image provided by the optical model part of the simulation system. This separation between the optical model and the resist model being coupled by an aerial image is schematically indicated in FIG. 1. For simplicity, optional modeling of further processes, e.g., etch, ion implantation, or similar steps, is omitted.

Finally, the output of the simulation process will provide information on the predicted shapes and sizes of printed features on the wafer, such as predicted critical dimensions (CDs) and contours. Such predictions allow a quantitative evaluation of the lithographic printing process and on whether the process will produce the intended results.

As lithography processes entered below the 65 nm node, 4× reticles for leading-edge chip designs have minimum feature sizes smaller than the wavelength of light used in advanced exposure tools. The thin-mask approximation, however, is very inaccurate at sub-wavelength dimensions where topographic effects (also called thick-mask effects) arising from the vector nature of light become noticeable. These effects include polarization dependence due to the different boundary conditions for the electric and magnetic fields, transmission and phase error in small openings, edge diffraction (or scattering) effects or electromagnetic coupling. (See "Limitation of the Kirchhoff boundary conditions for aerial image simulation in 157 nm optical lithography," M. S. Yeung and E. Barouch, IEEE Electron Devices Letter, Vol. 21, No. 9, pp. 433-435, (2000) and "Mask topography effects in projection printing of phase-shifting masks," A. K. Wong and A. R. Neureuther, IEEE Trans. On Electron Devices, Vol. 41, No. 6, pp. 895-902, (1994)). Consequently, resource-consuming rigorous 3D electromagnetic field simulation has become necessary in aerial image formation of a thick-mask, e.g., a PSM mask. However, software that implements such rigorous 3D electromagnetic field simulation often runs extremely slow and hence is limited to extremely small areas of a chip design layout (on the order of a few square microns). Software tools in this category include "SOLID-E" from Sigma-E (Santa Clara, Calif., USA), "Prolith from KLA-Tencor (San Jose, Calif., USA), and "EM-Suite" from Panoramic Technology (San Francisco, Calif., USA). These software tools are not viable for full-chip lithography modeling. Some efforts have been made to address mask 3D effects recently for full-chip lithography modeling. Two major approaches in the literature are the domain decomposition method (DDM) and the boundary layer model (BLM). (See "Simplified Models for EDGE Transitions in Rigorous Mask Modeling," K. Adam, A. R. Neureuther, Proc. of SPIE, Vol. 4346, pp. 331-344, (2001) and "Boundary Layer Model to Account for Thick Mask Effects in Photolithography," J. Tirapu-Azpiroz, P. Burchard, and E. Yablonovitch, Optical Microlithography XVI, Anthony Yen, Ed., Proc. of SPIE, Vol. 5040, pp. 1611-1619, (2003)).

The DDM is based on the idea that the near field characteristics of complex masks are equivalent to the superposition of the diffraction of other masks that comprised the original mask. A particular form of DDM, the edge-DDM, includes three steps. First, all types of edge structures that will be encountered in any mask design data are identified and for each edge structure, an electromagnetic spectrum is simulated using one of the existing rigorous 2D algorithms, e.g., Finite-Discrete-Time-Domain (FDTD) or Rigorous Coupled-Waveguide Analysis (RCWA), to generated a library. Next, original mask design data are decomposed into a set of edge structures and its corresponding electromagnetic spectrum is selected from the pre-simulated library. Finally, all selected spectra are combined based on the decomposition information to form a synthesized, approximate near electric field distribution for the original mask design data. The main advantage of edge-DDM is that it provides a simple method to simulate any arbitrary, "Manhattan" structure to an accuracy level equal to rigorous thick mask simulations with a speed that can be extended to full chip mask calculations. There are, however, two major limitations with implementing edge-DDM. First, electromagnetic cross-talk between adjacent and connecting edges will grow as mask dimension continue to shrink. These nonlinear cross-talking effects cannot be taken into account by edge-DDM because the mask structure can no longer be treated as linear combinations of scattering effects from isolated edge components. The other problem is that more high scattered orders will be collected by the imaging system when both high angle off-axis illumination and larger numerical apertures are utilized for mask inspection. (See "Domain decomposition methods for simulation of printing and inspection of phase defects," M. Lam, K. Adam, and A. Neureuther, Optical Microlithography XVI, Anthony Yen, Ed., Proc. of SPIE, Vol. 5040, pp. 1492-1501, (2003)).

Alternatively, Tirapu-Azpiroz et al. proposed the boundary layer model to alternating phase-shifting masks by adding local perturbations (in the form of local rectangular functions with adjustable width, transmission and phase) near the edges of the phase shifting region. Bai has applied the boundary layer model to effectively approximate the 3D mask effect of alternating aperture phase-shifting mask (AAPSM). (See "Approximation of Three Dimensional Mask Effects with Two Dimensional Features," M. Bai, et al., Emerging Lithographic Technologies IX, R. Scott Mackay, Ed., Proc. SPIE, Vol. 5751, pp. 446-454, (2005)). Unlike the models relying simply on the thin-mask model, the boundary layer model incorporates topographic effects and polarization dependencies of the field transmitted by the mask and can account for nonlinear interaction effects from nearby edges. It is almost a complete empirical approach, with no first-principle components and every parameter of the boundary layer structure is based on calibration of a particular mask structure that the boundary layer is attached to.

While both methods have demonstrated some successes, their disadvantages, such as inability to take into account cross-talking effects or inability to systematically generate a mask 3D model, have limited their use to more general mask features. Furthermore, both methods are either polygon-based or edge-based approaches that are not suitable for implementing into a high-speed parallel image computing system, such as the system described in U.S. Pat. No. 7,003,758. As a result, there exists a strong need for methods to create a very fast and very accurate imaging-based 3D mask model that includes mask polarization and edge scattering effects as well as supports partially polarized illumination. Such an imaging-based 3D mask model should be easily implemented into a full-chip lithography simulation system, such as the one described in U.S. Pat. No. 7,003,758.

SUMMARY

A three-dimensional mask model of the invention provides a more realistic approximation of the three-dimensional effects of a photolithography mask with sub-wavelength features than a thin-mask model. The three-dimensional mask model is applied to mask layout data to produce a near-field image that is then input into a photolithography simulation system. The three-dimensional mask model provides better accuracy to predict patterning performance of a lithography process, to verify optical proximity corrections, or any other application of lithography simulation.

In one embodiment, the three-dimensional mask model includes a set of filtering kernels in the spatial domain that are configured to be convolved with thin-mask transmission functions to produce a near-field image. The set of filtering kernels are created using rigorous electromagnetic field simulations of light passing through a calibration mask with a known topography. The set of filtering kernels is specific to a type of mask, for example a binary mask or phase-shifting mask, but is independent of any particular mask layout.

In another embodiment, the three-dimensional mask model includes a set of correction factors in the frequency domain that are configured to be multiplied by the Fourier transform of thin-mask transmission functions to produce a near-field image. The set of correction factors are created using rigorous electromagnetic field simulations of light passing through a calibration mask with a known topography. The set of correction factors is specific to a type of mask, for example a binary mask or phase-shifting mask, but is independent of any particular mask layout.

DETAILED DESCRIPTION

Figure 1:
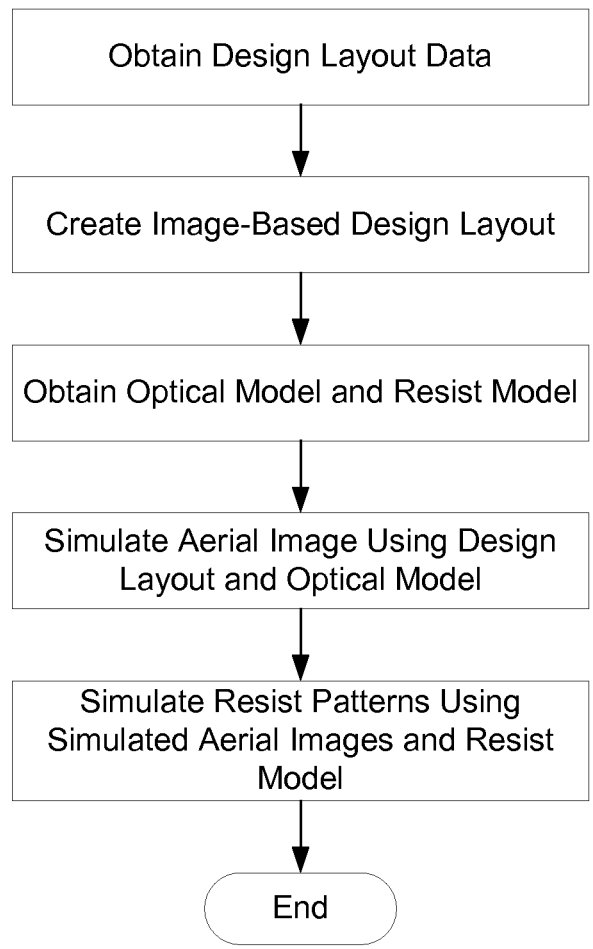
FIG. 1 is a flowchart of method steps for photolithography simulation.
Figure 2:
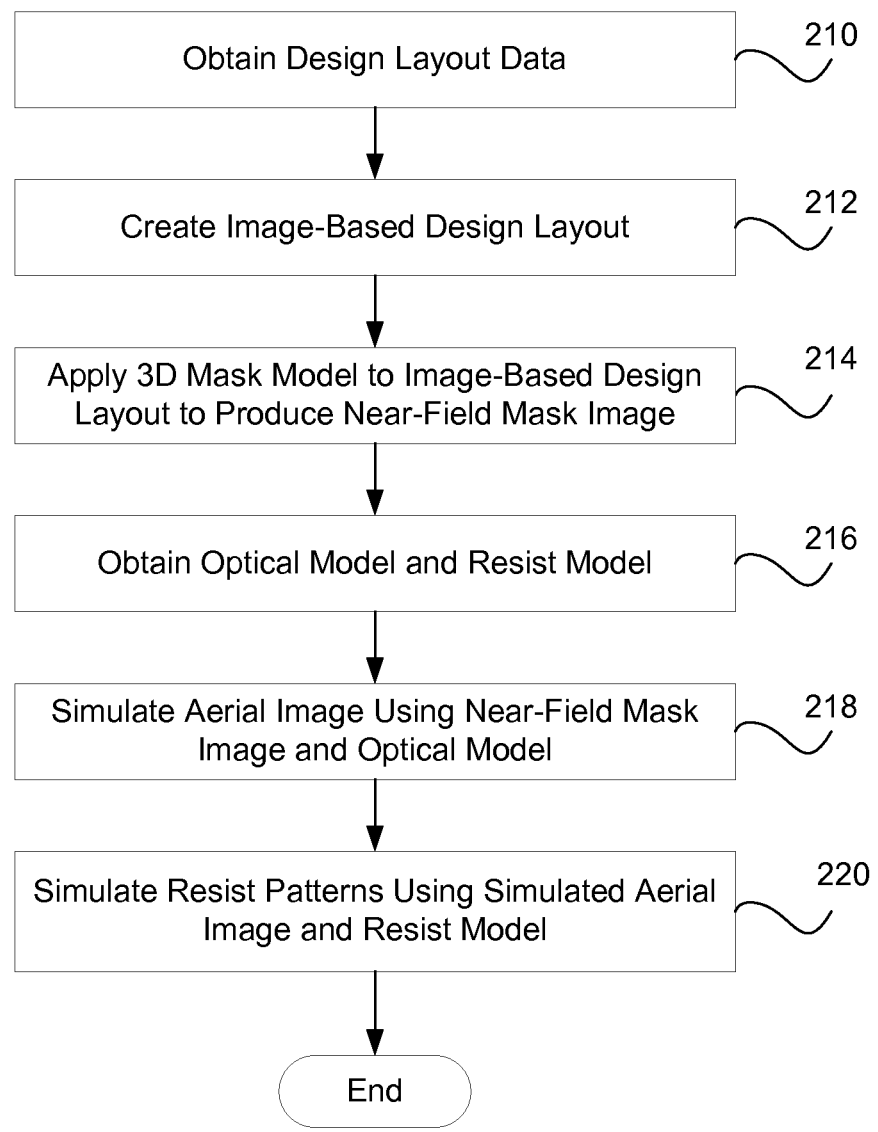
FIG. 2 is a flowchart of method steps for photolithography simulation using a 3D mask model, according to one embodiment of the invention.

FIG. 2 is a flowchart of method steps for photolithography simulation using a 3D mask model, according to one embodiment of the invention. In step 210, circuit design layout data is obtained. The circuit design data is typically in the form of a polygon-based hierarchical data file in the GDS or OASIS format. In step 212, an image-based design layout is created from the design layout data. In step 214, a three-dimensional (3D) mask model is applied to the image-based design layout to produce a near-field mask image. The 3D mask model is a representation of the effects of the three-dimensional physical structure of the mask on the projected light. A method for creating a 3D mask model is described below in conjunction with FIG. 3.

In step 216, an optical model of the exposure tool and a resist model are obtained. In step 218, an aerial image is simulated using the near-field mask image and the optical model. In step 220, the resist patterns on the wafer are simulated using the simulated aerial image and the resist model.

Figure 3:
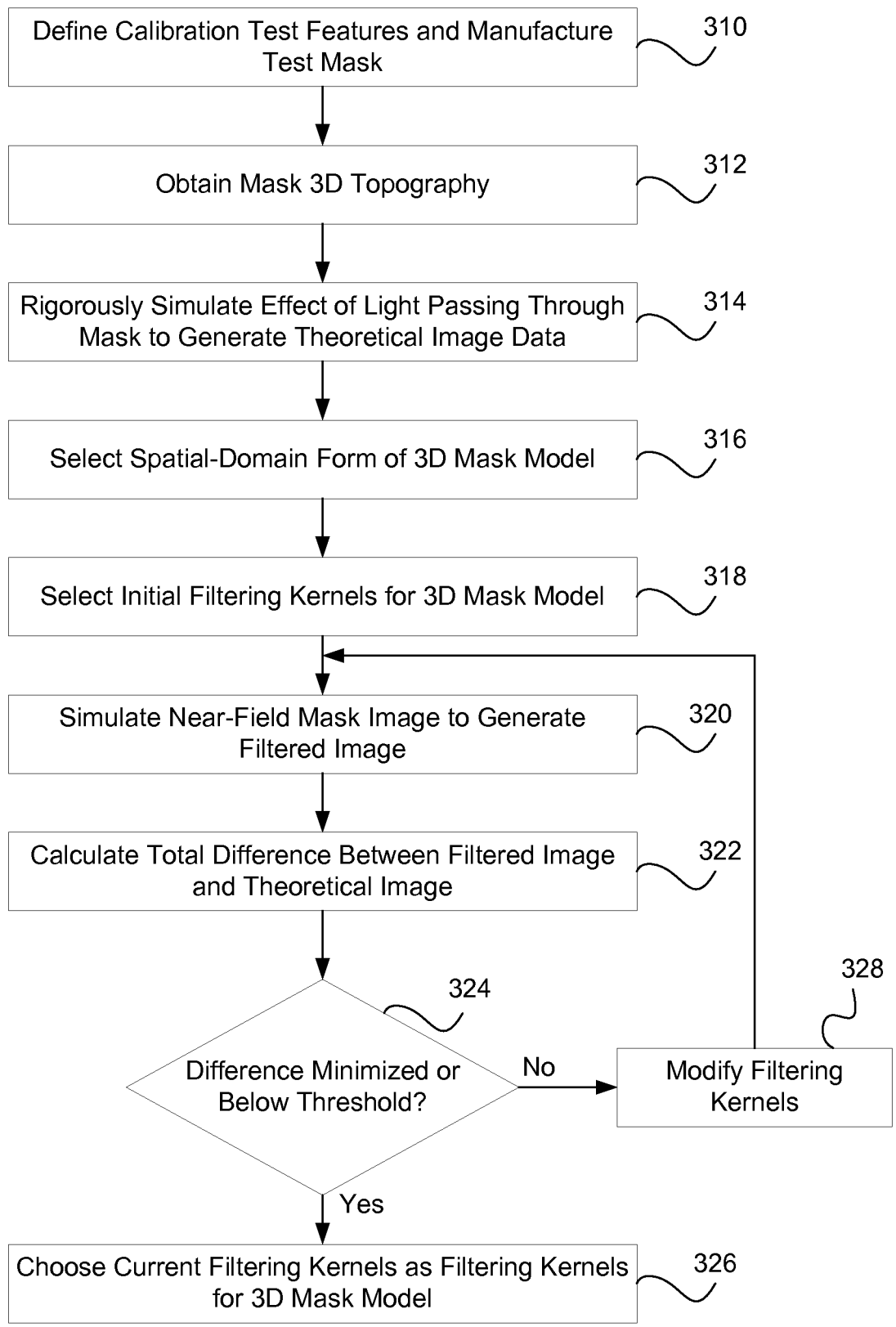
FIG. 3 is a flowchart of method steps for creating a 3D mask model, according to one embodiment of the invention.

FIG. 3 is a flowchart of method steps for creating a 3D mask model, according to one embodiment of the invention. In step 310, calibration test features are defined. The calibration test features can be imported from an existing design layout or can be specially generated for creating the 3D mask model. A test mask including the set of calibration test features is then manufactured. The calibration test features preferably cover a full range of different 3D mask topography profiles and different proximity interactions that are characteristic of the lithography process under consideration. A wide range of line/space patterns with varying pitches (from isolated to dense), and two-dimensional patterns such as line/space ends with varying gap sizes should be included. The line/space patterns span over a one-dimensional spatial frequency space while the line end patterns cover two-dimensional effects, in particular line-end pull back, pinching, etc. The test mask can be any type of optical mask, for example a chrome-on-glass binary mask or an EPSM phase-shifting mask. Each 3D mask model will be specific to a type of optical mask, although each 3D mask model is independent of the mask's layout.

In step 312, the test mask is inspected to obtain mask 3D topography data, including the thickness of films on the mask. A variety of metrology tools can be used to inspect the test mask. These metrology tools include, but are not limited to, conventional optical mask inspection tools, critical dimension scanning electron microscopes (CD-SEMs) or imaging SEMs, atomic force microscopes (AFMs) or scatterometry systems, or aerial image measurement system (AIMS) tools. The physical mask 3D topography data can also be obtained from an individual mask error model and post-OPC layout data as described in U.S. Pat. No. 7,587,704, the subject matter of which is hereby incorporated by reference in its entirety.

In step 314, the effect of light passing through the test mask is rigorously simulated using the mask 3D topography data from the test mask and well-known equations describing the behavior of light (Maxwell's equations) to generate theoretical image data. In one embodiment, the mask 3D topography data are input into a rigorous 3D electromagnetic field (EMF) solver software program and rigorous simulations of the near-field complex field distribution are obtained. The EMF solver software can use any rigorous electromagnetic field algorithm, for example, a Finite-Discrete-Time-Domain (FDTD) algorithm or a Rigorous-Coupled Waveguide Analysis (RCWA) algorithm. The simulations typically assume that the light passing through the mask is a single plane wave. Different polarization conditions are applied to the rigorous simulations, for example, x-polarization and y-polarization or TE-polarization and TM-polarization. Any other polarization condition can be represented by a linear combination of x- and y-polarizations or TE and TM polarizations.

Figure 5A:
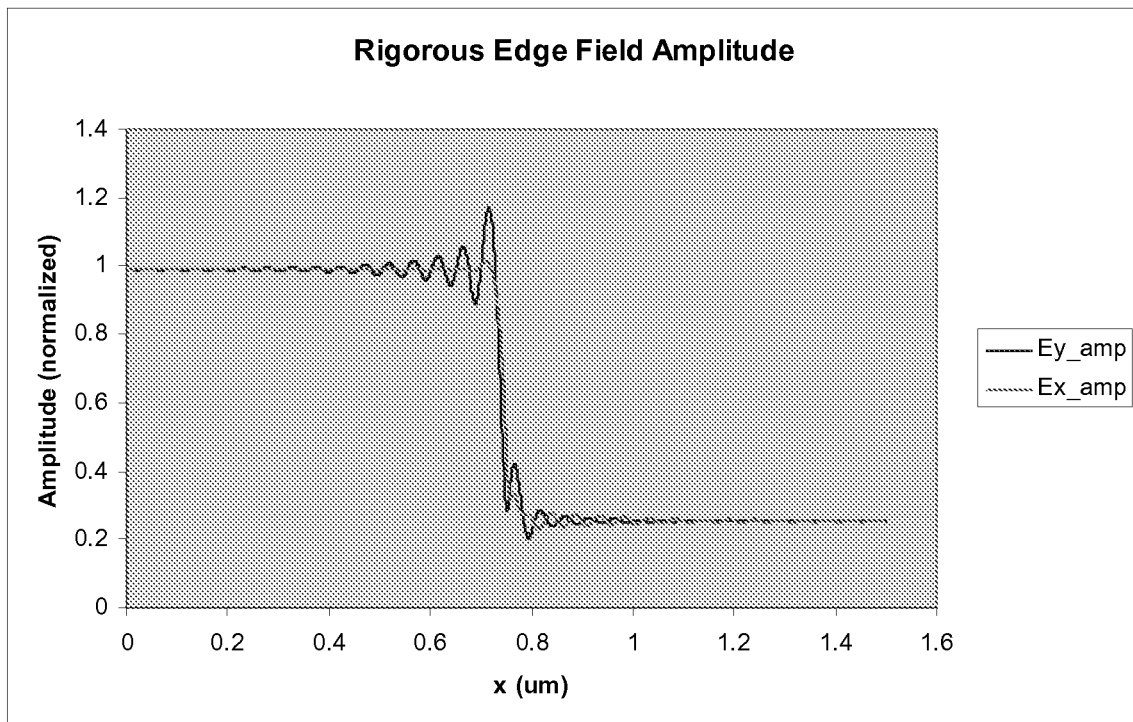
FIG. 5A is a cross-section plot of a rigorously simulated near-field amplitude distribution of a mask edge step.
Figure 5B:
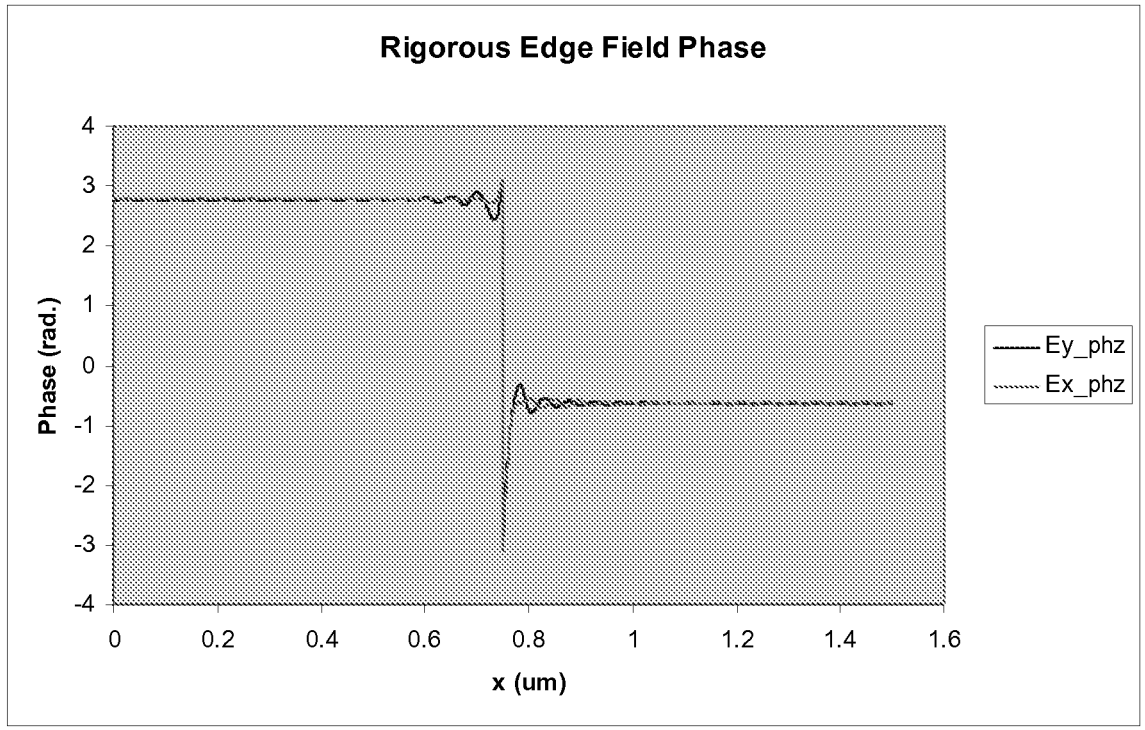
FIG. 5B is a cross-section plot of a rigorously simulated near-field phase distribution of a mask edge step.

FIGS. 5A and 5B show exemplary cross-section plots of the rigorous simulated near-field amplitude and phase responses of an EPSM phase-shifting mask edge step with x and y polarized illuminations, respectively.

Returning to FIG. 3, in step 316, a spatial-domain form of a 3D mask model is selected. In the FIG. 3 embodiment, the form of the 3D mask model is in the spatial domain, and in another embodiment shown in FIG. 4, the form of the 3D mask model is in the frequency domain. The spatial-domain form of the image-based 3D mask model consists of a set of calibrated complex filtering kernels. In step 318, initial filtering kernels for the 3D mask model are selected. Due to the mask 3D edge scattering effects and the cross-talk between close edges, the near-field electric distribution is no longer symmetric around the edge step. In order to approximate an arbitrary non-symmetric edge function, the near-field electric distribution computed from the rigorous simulation is decomposed into odd and even components, modeled by linear and bilinear filtering kernels, respectively. For the spatial-domain form of the 3D mask model, the near-field electric distribution with real mask 3D effects considered is modeled by the following:

$$m3_x = M \otimes T_x + \left(\frac{dM}{dx}\right)^2 \otimes T_{xx} + \left(\frac{dM}{dy}\right)^2 \otimes T_{xy} \qquad (1)$$

-continued $$m3_y = M \otimes T_y + \left(\frac{dM}{dx}\right)^2 \otimes T_{yx} + \left(\frac{dM}{dy}\right)^2 \otimes T_{yy} \quad (2)$$

where M3x and M3y are the complex near-field Ex and Ey field output with mask 3D effects considered (the filtered image), M is the image of the mask design layout, $$\left(\frac{dM}{dx}\right)^2$$

is to produce a kind of "positive" pulse at feature edges, and Tx, Txx, and Txy are filtering kernels that need to be calibrated. All operations are based on gray-level images. Due to physical symmetry requirements, Tx and Ty are 90 degree rotations of each other, Txx and Tyy are 90 degree rotations of each other, and Txy and Tyx are 90 degree rotations of each other. Therefore, if the filtering kernels for M3x are calibrated, there is no need to calibrate filtering kernels for M3y. In step 320, the mask near-field images are simulated by convolving the mask layout image and its derivative with the filtering kernels, Tx, Txx, and Txy according to Eqs. 1 and 2, to produce a filtered image.

In step 322, a total difference between the filtered image and the theoretical image is calculated to calibrate the filtering kernels of the 3D mask model, Tx, Txx, and Txy toward the rigorous 3D simulation results. In step 324, if the total difference between the filtered image and the theoretical image is minimized or below a predetermined threshold, the method continues with step 326. If the total difference between the filtered image and the theoretical image is not minimized or below the predetermined threshold, the method continues with step 328. In step 328 the filtering kernels Tx, Txx, and Txy are modified. The method then returns to step 320, and steps 320,322,324, and if needed, step 328 are repeated until the total difference between the filtered image and the theoretical image is minimized or below the predetermined threshold. In step 326, the current filtering kernels are chosen as the final filtering kernels for the 3D mask model.

Figure 6A:
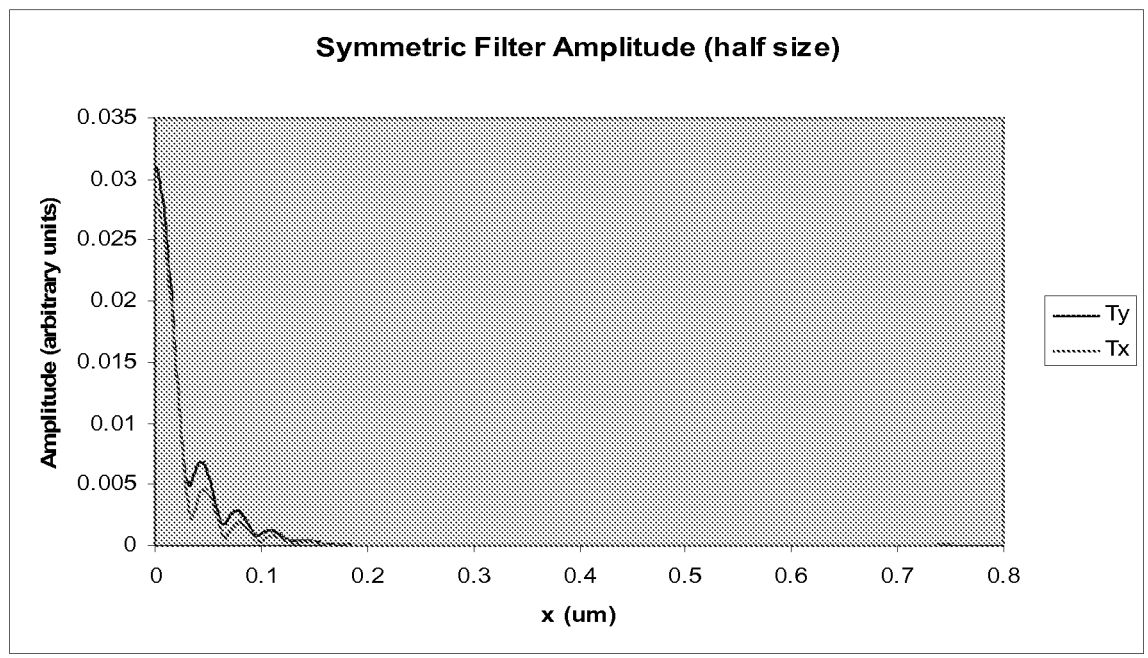
FIG. 6A is a cross-section plot of the amplitude of linear filtering kernels of a 3D mask model, according to one embodiment of the invention.
Figure 6B:
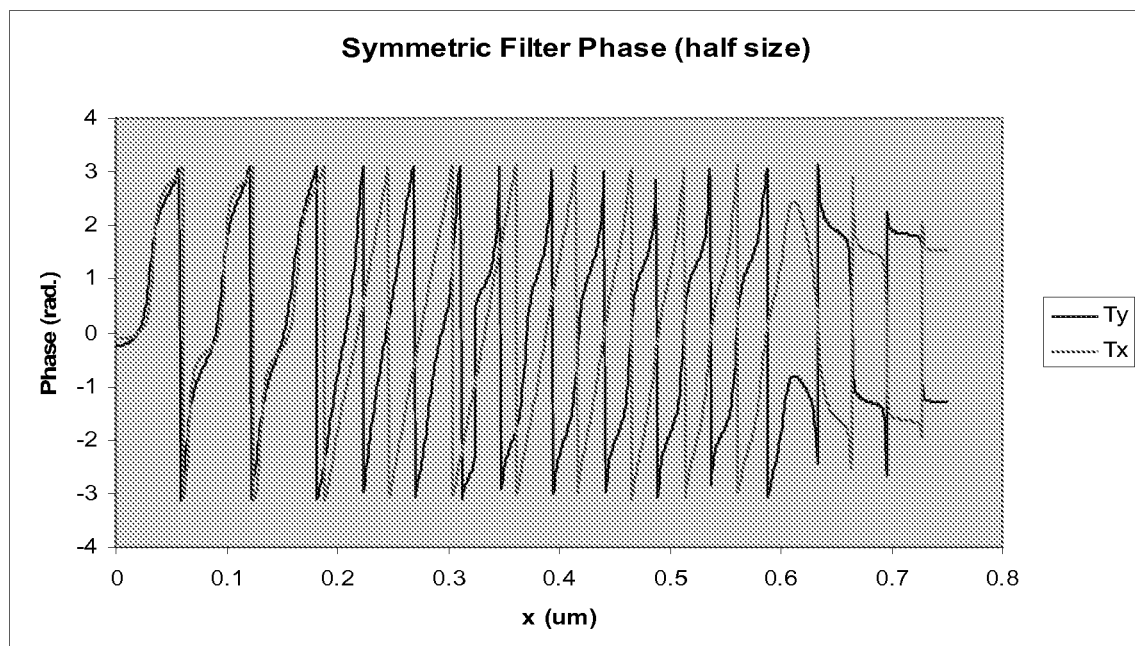
FIG. 6B is a cross-section plot of the phase of linear filtering kernels of a 3D mask model, according to one embodiment of the invention.
Figure 6C:
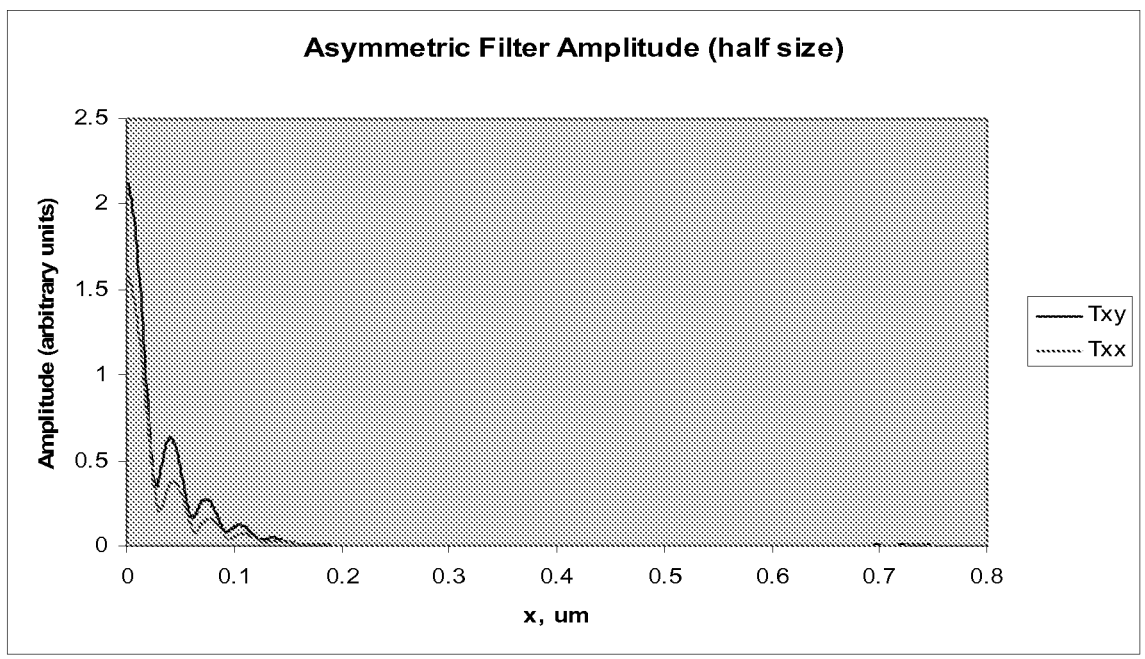
FIG. 6C is a cross-section plot of the amplitude of bilinear filtering kernels of a 3D mask model, according to one embodiment of the invention.
Figure 6D:
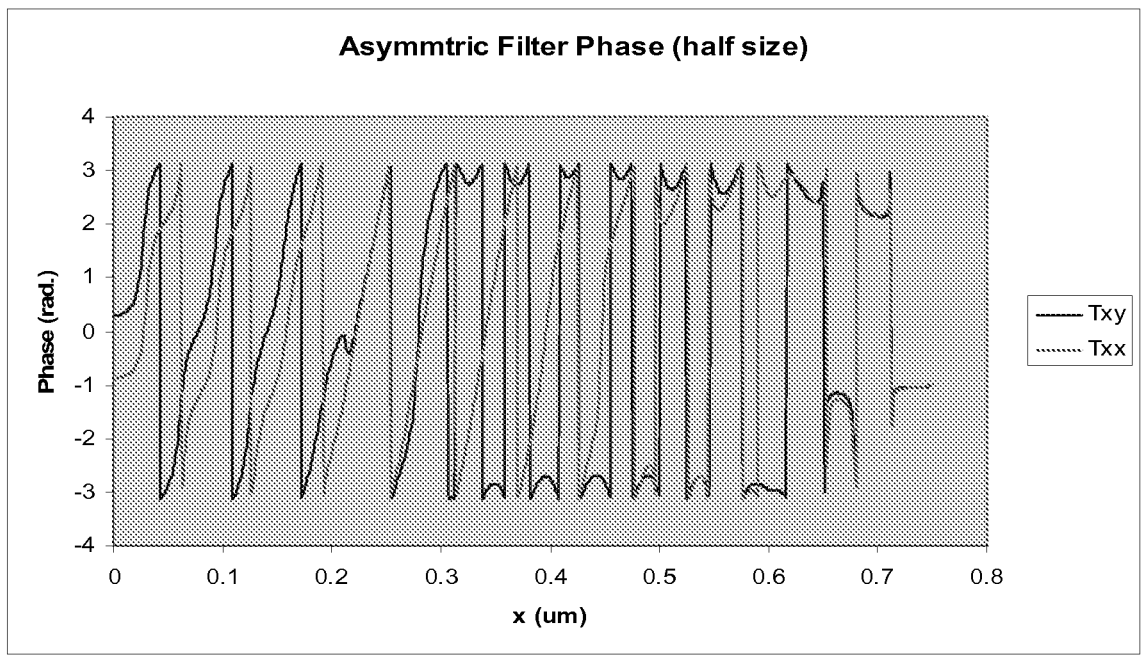
FIG. 6D is a cross-section plot of the phase of bilinear filtering kernels of a 3D mask model, according to one embodiment of the invention.

FIGS. 6A and 6B show cross-section plots of the amplitude and phase of the symmetric filtering kernels, Tx and Ty, calibrated from the rigorous near-field electric distributions shown in FIGS. 5A and 5B for an EPSM mask. FIGS. 6C and 6D show cross-section plots of the amplitude and phase of the asymmetric filtering kernels, Txx and Txy, calibrated from the rigorous near-field electric distributions shown in FIGS. 5A and 5B.

In another embodiment, the spatial-domain form of the 3D mask model is represented by Eqs. 3 and 4, which use the combination of linear and bilinear kernels as in Eqs. 1 and 2 but does not require the calculation of mask image derivative, $$\left(\frac{dM}{dx}\right) \text{ and } \left(\frac{dM}{dy}\right),$$

to model the mask transform:

$$M3_x = M \otimes T_x + \alpha_{xx}^* |M \otimes T_{xx}|^2 + \alpha_{xy}^* |M \otimes Txy|^2 \quad (3)$$

$$M3_y = M \otimes T_y + \alpha_{yx}^* |M \otimes T_{yx}|^2 + \alpha_{yy}^* |M \otimes T_{yx}|^2 \quad (4)$$

The symmetry properties for the filtering kernels, Tx, Txx, Txy, are the same as in Eqs. 1 and 2, where square of derivatives is used. All filtering kernels are also x and y flip symmetric.

As shown in Eqs. 3 and 4, M3x computed from rigorous simulation can be decomposed into odd and even components, modeled by linear and bilinear kernels, respectively. The a coefficients are constants that may be complex.

A further optimization of the spatial-domain form of the 3D mask model is to combine Txx and Txy into one bilinear kernel. The benefit of this approach is not so much in speed, but in form and rotational properties. A combined bilinear kernel has enough degrees of freedom to accommodate many calibration patterns.

Figure 4:
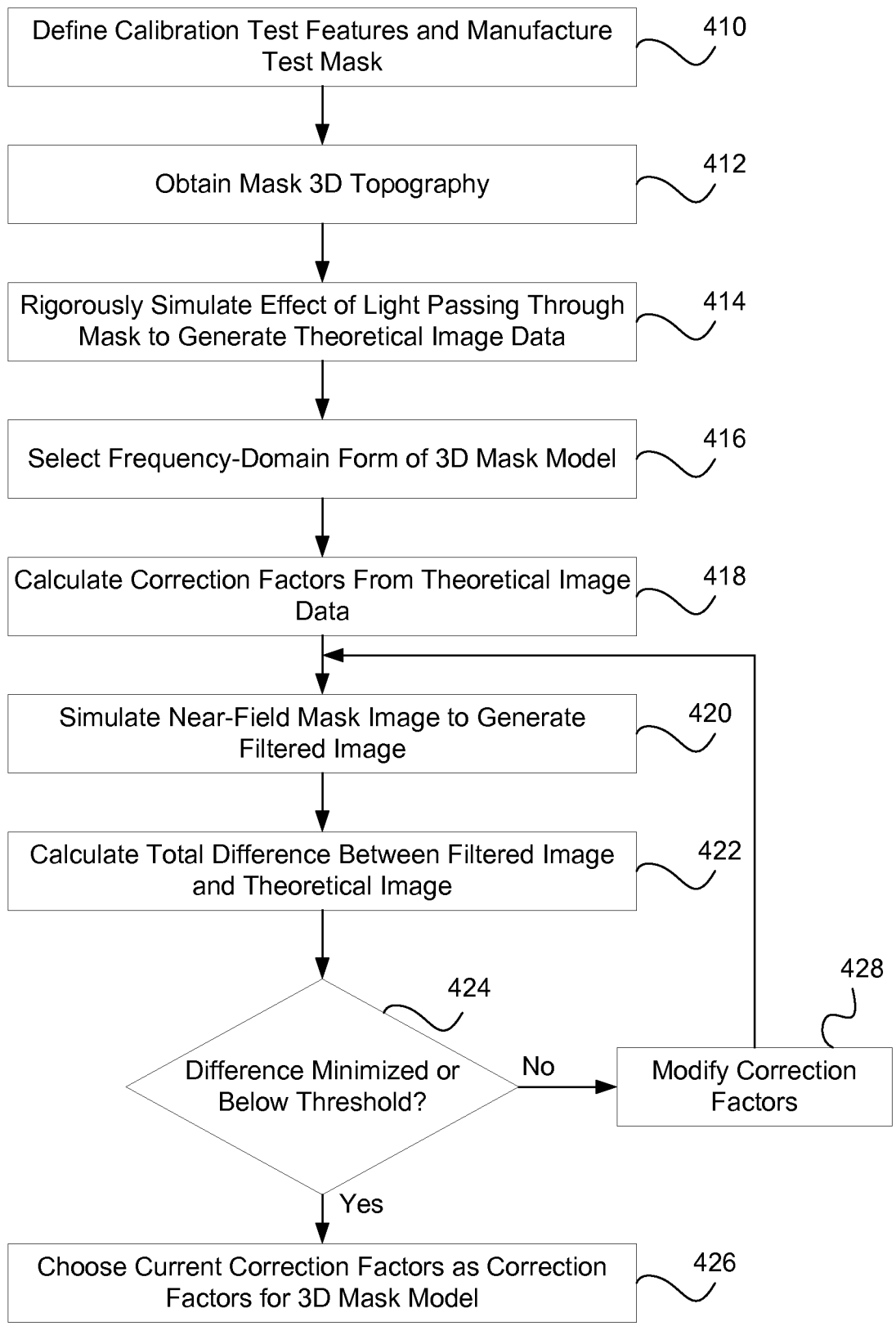
FIG. 4 is a flowchart of method steps for creating a 3D mask model, according to another embodiment of the invention.

FIG. 4 is a flowchart of method steps for creating a 3D mask model, according to one embodiment of the invention. In step 410, calibration test features are defined. In step 412, the test mask is inspected to obtain mask 3D topography data, including the thickness of films on the mask. In step 414, the effect of light passing through the test mask is rigorously simulated using the mask 3D topography data from the test mask and well-known equations describing the behavior of light to generate theoretical image data.

In step 416, a frequency-domain form of the 3D mask model is selected. The frequency-domain form of the 3D mask model has a compact mathematical representation and is capable of modeling corner scattering effects and feature-to-feature interactions. The frequency-domain form of the 3D mask model also takes into account the non-Hopkins oblique incidence effects of a mask.

The frequency-domain form of the 3D mask model for a given mask layout represents the Fourier transform of the mask's transmitted electromagnetic field:

$$t_{3D}(\vec{f}) = c(\vec{f})t(\vec{f}) + c_H(\vec{f})t_H(\vec{f}) + c_V(\vec{f})t_V(\vec{f}) + c_C(\vec{f})t_C(\vec{f}) \quad (5)$$

where $t(\vec{f})$=Fourier transform of the original thin mask transmission function, $t_H(\vec{f})$=Fourier transform of the horizontal edge function, $t_V(\vec{f})$=Fourier transform of the vertical edge function, $t_C(\vec{f})$=Fourier transform of the corner function, and $(\vec{f})=(f_x, f_y)$=spatial frequencies.

The coefficients $c(\vec{f})$, $c_H(\vec{f})$, $c_V(\vec{f})$, and $c_C(\vec{f})$ are correction factors that modify the thin-mask transmission function into a thick-mask transmission function. The correction factors are also a function of polarization and incident angle, although not explicitly shown in Eq. 5. The correction factors are also dependent on the mask topography determined in step 412.

In step 418, the correction factors are calculated from the theoretical image data obtained from rigorous simulations. In step 420, the near-field mask image is simulated using the 3D mask model to generate a filtered image. In step 422, a total difference between the filtered image and the theoretical image is calculated to calibrate the correction factors of the 3D mask model toward the rigorous 3D simulation results. In step 424, if the total difference between the filtered image and the theoretical image is minimized or below a predetermined threshold, the method continues with step 426. If the total difference between the filtered image and the theoretical image is not minimized or below the predetermined threshold, the method continues with step 428. In step 428 the correction factors are modified. The method then returns to step 420, and steps 420,422,424, and if needed, step 428 are repeated until the total difference between the filtered image and the theoretical image is minimized or below the predetermined threshold. In step 426, the current correction factors are chosen as the final correction factors for the 3D mask model.

Two embodiments of the frequency-domain form of the 3D mask model include oblique incidence effects in 3D masks within the framework of Hopkins's TCC method. The first embodiment includes no additional approximations, but using it requires substantial changes to the optical model of the lithography process originally developed using a thin mask model. The second embodiment includes an additional approximation, but using it requires almost no change to the existing lithography simulation process and still offers improved accuracy over Hopkins's treatment of oblique incidence.

In the first embodiment, the wafer image can be written in the following general form.

$$I(\vec{x}) = \sum_{\vec{f}',\vec{f}'',\vec{f}_{inc},pol} S_{pol}(\vec{f}_{inc}) t_{3D,pol}(\vec{f}',\vec{f}_{inc}) \quad (6)$$

$$t^*_{3D,pol}(\vec{f}'',\vec{f}_{inc}) \vec{P}_{pol}(\vec{f}',\vec{f}_{inc}) \cdot \vec{P}^*_{pol}(\vec{f}'',\vec{f}_{inc}) e^{2\pi i (\vec{f}'-\vec{f}'')\vec{x}}$$

where
pol=polarization (the summation is over orthogonal components),
$\vec{f}_{inc}$=incident planewave spatial frequency,
$S_{pol}(\vec{f}_{inc})$=source intensity,
$\vec{P}_{pol}(\vec{f})$=generalized pupil function including all optical effects of the projection system.

It is assumed/approximated that an image produced by an illumination having a degree of polarization less than 100% can be modeled as an incoherent weighted sum of images produced by two orthogonal near fields at the mask. Substituting Eq. 5 into Eq. 6 produces $$I(\vec{x}) = \sum_{\vec{f}',\vec{f}'',\alpha,\beta} t_\alpha(\vec{f}') t^*_\beta(\vec{f}'') TCC_{\alpha\beta}(\vec{f}'-\vec{f}'') e^{2\pi i(\vec{f}'-\vec{f}'')\vec{x}}, \quad (7)$$

where $$t_\alpha(\vec{f}) \text{ or } t_\beta(\vec{f}) = t(\vec{f}), t_H(\vec{f}), t_V(\vec{f}) \text{ or } t_C(\vec{f}) \quad (8)$$

$$TCC_{\alpha\beta}(\vec{f}',\vec{f}'') \sum_{\vec{f}_{inc},pol} S_{pol}(\vec{f}_{inc}) c_{\alpha,pol}(\vec{f}',\vec{f}_{inc})$$

$$c^*_{\beta,pol}(\vec{f}'',\vec{f}_{inc}) \vec{P}_{pol}(\vec{f}',\vec{f}_{inc}) \cdot \vec{P}^*_{pol}(\vec{f}'',\vec{f}_{inc}) \quad (9)$$

Three-dimensional thick mask scattering effects and oblique incidence effects are included in the transmission cross-coefficients (TCCs) of the optical model, and there are two kinds of TCCs in Eq. 9. The first is Hermitian where $\alpha=\beta$, and the other is non-Hermitian where $\alpha\neq\beta$. For terms having Hermitian TCC's, the method of classical sum of coherent systems can be used to compute their image contributions. For non-Hermitian terms, an eigen-decomposition can be done on the system but will produce two sets of eigenvectors—left and right eigenvectors, with left eigenvectors orthogonal to right eigenvectors and vice versa. Therefore, each term's image contribution can be written as a sum of generalized coherent systems. (Each "generalized coherent system" gives rise to a pseudo-intensity distribution equal to the product of "left" and "right" amplitudes. These amplitudes are the result of the mask convolved with "left" and "right" complex filters, and are different from each other.) Although each individual term $\alpha\beta$ ($\alpha\neq\beta$) is generally complex, it always has a counter part (obtained by exchanging index a and P) which is its complex conjugate. Therefore the total image is always real.

If $t_H(\vec{f})$, $t_V(\vec{f})$ and $t_C(\vec{f})$ are viewed as perturbations to the thin mask, then for first order approximation their cross terms are kept with the thin mask $t(\vec{f})$. Keeping the second order terms (cross terms between $t_H(\vec{f})$, $t_V(\vec{f})$ and $t_C(\vec{f})$) allows for capture of feature-to-feature interactions due to 3D scattering.

In the second embodiment of the frequency-domain form of the 3D mask model including oblique incidence effects, Eq. 6 is approximated using an effective transmission function $\tilde{t}_{3D}(\vec{f})$:

$$\tilde{I}(\vec{x}) = \sum_{\vec{f}',\vec{f}'',\vec{f}_{inc},pol} S_{pol}(\vec{f}_{inc}) \tilde{t}_{3D}(\vec{f}') \quad (10)$$

$$\tilde{t}^*_{3D}(\vec{f}'') \vec{P}_{pol}(\vec{f}',\vec{f}_{inc}) \cdot \vec{P}^*_{pol}(\vec{f}'',\vec{f}_{inc}) e^{2\pi i(\vec{f}'-\vec{f}'')\vec{x}}.$$

Once the effective transmission function is obtained, the wafer image can be simulated using existing lithography simulation systems designed for a thin mask model without any changes. Accordingly, Eq. 5 becomes $$\tilde{t}_{3D}(\vec{f}) = \tilde{c}(\vec{f}) t(\vec{f}) + \tilde{c}_H(\vec{f}) t_H(\vec{f}) + \tilde{c}_V(\vec{f}) t_V(\vec{f}) + \tilde{c}_C(\vec{f}) t_C(\vec{f}) \quad (11)$$

The key to this embodiment is finding the effective transmission function $\tilde{t}_{3D}(\vec{f})$, or equivalently, the effective correction factors $\tilde{c}_H(\vec{f})$, $\tilde{c}_H(\vec{f})$, $\tilde{c}_V(\vec{f})$ and $\tilde{c}_C(\vec{f})$ in Eq. 11, such that the difference between the approximation, Eq. 10, and the true image, Eq. 6, is minimized. The problem becomes similar to an inverse lithography problem. It is reasonable to assume that the effective transmission function is in the neighborhood of the transmission function of normal incidence otherwise the result may not be physical. Therefore a gradient method combined with a linear programming technique can be used to solve the inverse problem. In this embodiment, effects from a plane wave and oblique waves are included in the rigorous simulations used to determine the initial effective correction factors.

Figure 7:
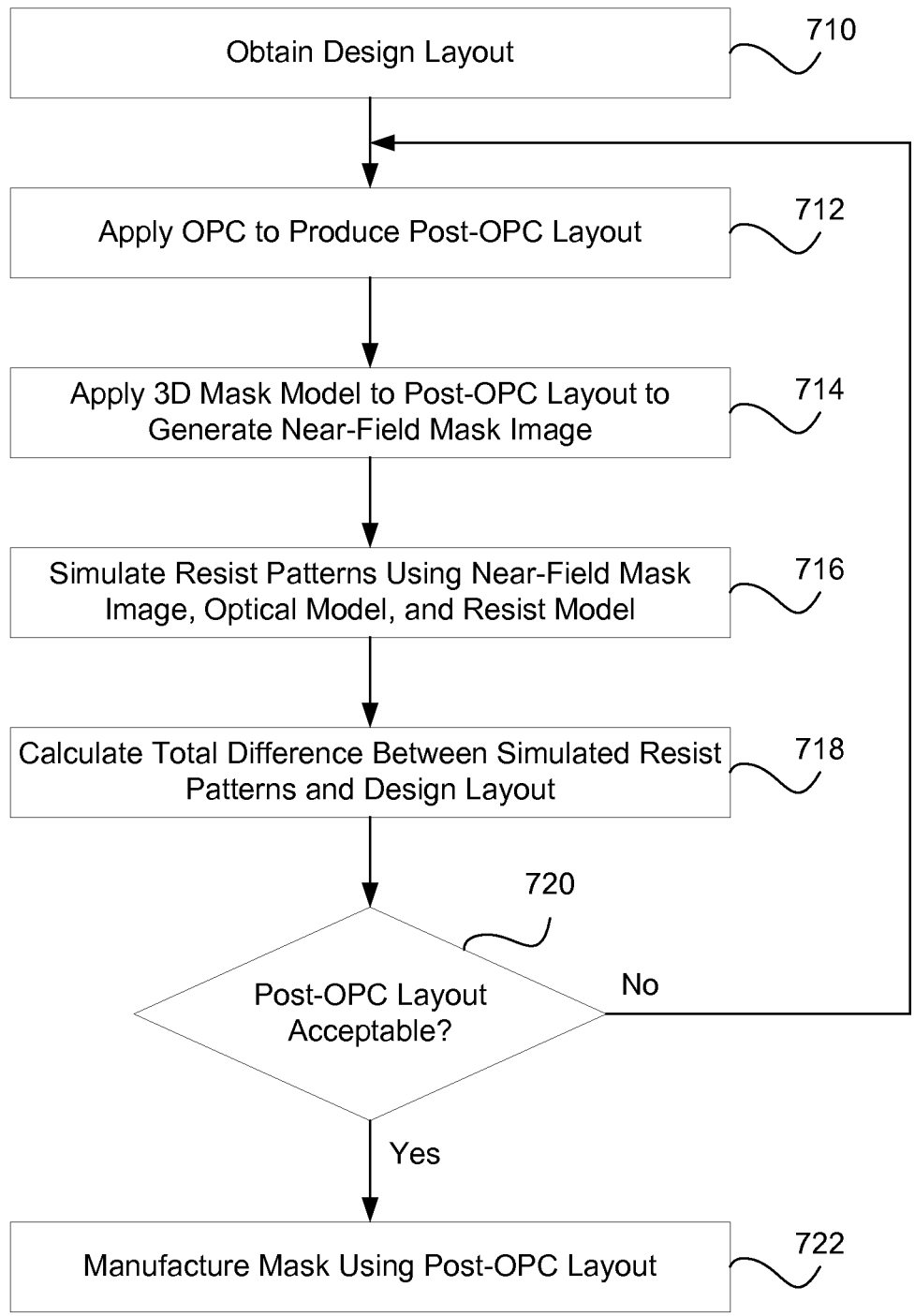
FIG. 7 is a flowchart of method steps for implementing OPC using a 3D mask model, according to one embodiment of the invention.

FIG. 7 is a flowchart of method steps for implementing OPC using a 3D mask model, according to one embodiment of the invention. In step 710, a design layout is obtained. In step 712, optical proximity corrections and optionally other RETs are applied to the design layout to produce a post-OPC mask layout. In step 714, a 3D mask model is applied to the post-OPC layout to generate a near-field mask image. The 3D mask model used should correspond to the type of mask (e.g., binary mask or phase-shifting mask) that will be manufactured. In step 716, resist patterns for the full chip are simulated using the near-field mask image generated using the 3D mask model, an optical model, and a resist model. In another embodiment, the optical model and the resist model can be replaced with a combined model that has optical and resist model components. An exemplary system and method for simulating a lithography process is disclosed in "System and Method for Lithography Simulation," U.S. Pat. No. 7,003,758, the subject matter of which is hereby incorporated by reference in its entirety. In step 718, a total difference between the simulated resist patterns and the pre-OPC design layout is calculated. In step 720, the total difference is evaluated to determine if the wafer pattern distortions caused by mask 3D effects is acceptable. The total difference may be evaluated by comparison with a threshold value or by determining if the total difference is minimized. If the post-OPC layout is acceptable, the method continues with step 722; if not, the method returns to step 712, where the total difference will be used to tune the post-OPC mask layout to produce a new post-OPC mask layout, and then the method continues until the post-OPC layout is acceptable. Once the simulated resist patterns are determined to be acceptable, then in step 722 a mask is manufactured according to the acceptable post-OPC mask layout.

Figure 8:
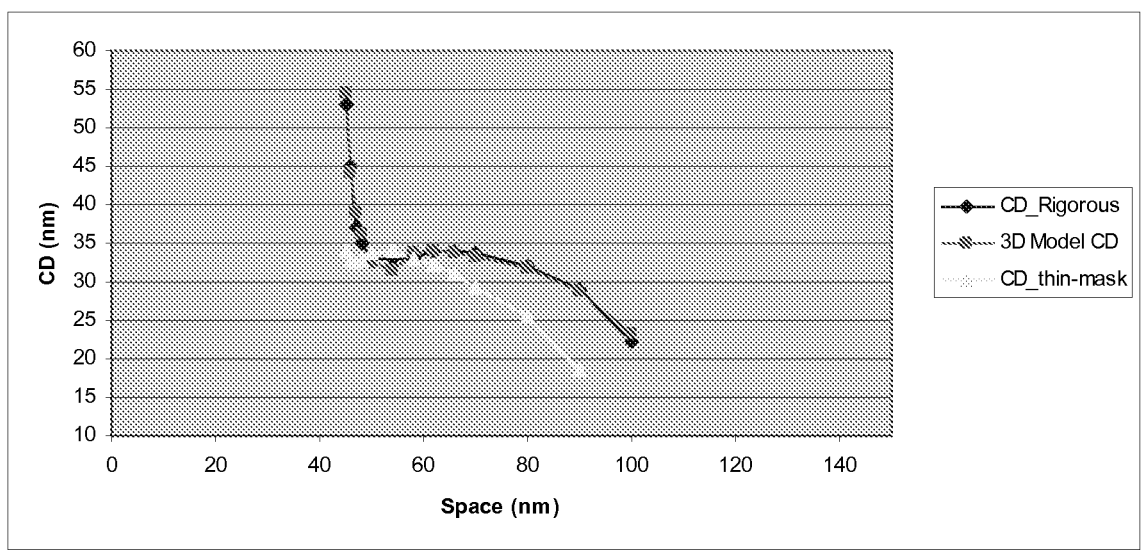
FIG. 8 is a diagram showing predictions of critical dimensions on a wafer using rigorous simulations, simulations using a thin-mask model, and simulations using a 3D mask model of the invention.

In computational lithography simulation, the output of the simulation process will provide information on the predicted shapes and sizes of printed features on the wafer, such as predicted critical dimensions (CDs) and contours. Such predictions allow a quantitative evaluation of the lithographic printing process and on whether the process will produce the intended results. Therefore, accurate CD predictions highly depend on the accuracy of the models used in the lithography simulation. The image-based 3D mask model provides more accurate CD prediction that a conventional thin-mask model. FIG. 8 is a diagram showing predictions of critical dimensions on a wafer using rigorous simulations, simulations using a thin-mask model, and simulations using a 3D mask model of the invention. The CDs predicted at various pitches using the 3D mask model are much closer to the rigorously simulated values than the CDs predicted using the thin-mask model. The 3D mask model of the invention will improve the predictive results from any application of lithography simulation because the 3D mask model provides a better approximation of a real mask than any thin-mask model.

Referring to U.S. Pat. No. 7,003,758 above (which as noted above is incorporated herein in its entirety and at least part of which is included below without limitation of incorporating herein the remainder), embodiments herein can involve a technique of, and system for simulating, verifying, inspecting, characterizing, determining and/or evaluating the lithographic designs, techniques and/or systems, and/or individual functions performed thereby or components used therein. In one embodiment, there is provided a system and method that accelerates lithography simulation, inspection, characterization and/or evaluation of the optical characteristics and/or properties, as well as the effects and/or interactions of lithographic systems and processing techniques. In this regard, in one embodiment, there is provided a lithography simulation system architecture, including application-specific hardware accelerators, and a processing technique to accelerate and facilitate verification, characterization and/or inspection of a mask design, for example, RET design, including detailed simulation and characterization of the entire lithography process to verify that the design achieves and/or provides the desired results on final wafer pattern. The system can include: (1) general purpose computing device(s) to perform case-based logic having branches and inter-dependency in the data handling and (2) an accelerator system to perform a majority of the computation intensive tasks.

In particular, in one embodiment, one or more general purpose-type computing devices are programmed and/or configured to handle job management of the overall operations of a system including, for example, partitioning a design database for analysis and conversion by an accelerator system. In addition, the one or more general purpose-type computing devices facilitate interaction with the user or operator (i.e., the "outside world") via, for example, client computer(s) that provide an operator or user access to the system for job setup and/or results review/analysis.

The accelerator system may be programmed to perform case-based logic having branches and inter-dependency in the data handling. In this regard, the accelerator system includes a microprocessor subsystem to manipulate and process the polygon (or the like) patterns that are typical with conventional lithographic simulation and design systems/techniques. Since there are many polygons in a typical design, and there are many different types and cases of polygons, the system employs a microprocessor subsystem of the accelerator system to implement programs or routines that manipulate the case-based logic (for example, "if this case, then; else if, then; and so on").

The accelerator system further includes suitably a programmed and configured accelerator subsystem (including application-specific hardware accelerators) that is coupled to the microprocessor subsystem to perform pixel-based image processing (for example, pixel-based gray-level image simulation). The pixel-based image processing may involve pixel-based computation, for example, filtering, re-mapping, Fourier Transform or other types of transformation. In these pixel-based computations, the data inter-dependency is minimized—which facilitates implementing parallel and pipelined computation.

In one embodiment, the lithography simulation, inspection, characterization and/or evaluation process includes pixel based lithography simulation. In those instances where the design database is based on polygons or the like, the system converts the polygon based database (containing the particular design) to a pixel-based image(s). There are many techniques for converting a polygon (or the like) to a multi-level image (for example, 2, 4, 8, . . . 64, 128, 256 or gray-level image). All such techniques, whether now known or later developed, are intended to be within the scope of the embodiments. For example, one method of conversion involves two major processes: (1) Fill a sub-pixel binary bitmap using scan-line process or technique. The sub-pixel size can be selected to be a fraction of the final pixel size, for example, ⅛ of a pixel. For each sub-pixel, if the sub-pixel is within a polygon, the sub-pixel is filled in 1; otherwise it is filled in 0. More sophisticated techniques include dithering, which is able to increase the filling resolution without reducing the sub-pixel size, but fill some sub-pixels as 1 and others as 0 if some neighboring sub-pixels are on the polygon edge (hence not completely inside nor completely outside a polygon). Dithering is a standard computer graphics technique; and/or (2) Apply an anti-aliasing filter to the sub-pixel binary bitmap, and at the same time down-sample the bitmap image to a pixel-sized multi-level image (for example, gray level image). Anti-aliasing filtering is a standard technique in image processing, and is used to limit the spatial frequency band of the image before down-sampling, so as to avoid aliasing. The design of the anti-aliasing filter needs to minimize the frequency content that will be folded back into the frequency band after down-sampling.

One significant advantage of using these two techniques in the polygon-to-gray-image conversion is that the polygon overlap is then automatically addressed. That is, when there is overlap of a polygon structure, a sub-pixel is filled with 1 twice when it resides in an overlapped area (or "filled" with 1 multiple times if the overlap involves more than two polygons), with the final filled value still being 1. So, any overlap is automatically resolved during the conversion process.

A significant decision in this image conversion step is the selection of the pixel size. In this regard, implementing a larger pixel size may result in a smaller amount of computation required in the downstream or later processing, and a larger induced image processing error. In one embodiment, the pixel size is selected so that it can sample the image above the Nyquist frequency in the aerial image. It is well known in the science of optical lithography that, regardless of illumination, partial coherence, and/or RET (for example, OPC and PSM) on masks, the maximum spatial frequency in the light intensity distribution on wafer plane may be characterized as $2 \times NA/\lambda$, where NA is the Numerical Aperture of the stepper projection optics, and $\lambda$ is the wavelength used in the imaging. It is also known in image processing that, if the sampling frequency is above twice of the maximum spatial frequency existing in the original image, one can accurately re-construct the original image from the sampled image. This is known as the Nyquist theorem, and the 2× of the maximum existing spatial frequency in the original image is called the Nyquist frequency. Accordingly, employing this relationship, the Nyquist sampling rate for aerial image in a stepper is $4 \times NA/\lambda$. As such, the pixel size may be at $p=\lambda/(4 \times NA)$ or smaller. For examples, for wavelength of 193 nm, and NA=0.65, the pixel size p may be 74 nm or smaller. For wavelength of 248 nm, and NA=0.65, the pixel size p may be 95 nm or smaller.

It should be noted that the pixel size selection described above is at the wafer aerial image level. Certain steppers implement an image size reduction when imaging from mask to wafer, and the pixel size on mask may be adjusted. For example, if the stepper reduction ratio is 4×, then the Nyquist sampling pixel size on mask is 4× larger than that on the wafer. Thus, under these circumstances, the sampling pixel size may be adjusted.

The converted pixel-based gray level image is representative of the mask. Mask RET (for example, OPC and PSM) may be incorporated into this image, since the RET features are typically part of the polygon database. For example, in the context of OPC, the decorations are typically extra polygons, so they automatically become part of the gray-level image. In the context of PSM, if there are only two types of phases "0" and "180" degrees, the sub-pixel bitmap may be filled with "−1" in the 180-degree phase region during the polygon-to-bitmap conversion, and the final gray-level image will involve both positive and negative values. Indeed, where the PSM includes phase differences beyond just 0 and 180 degrees, the bitmap value may include a corresponding phase factor, and the gray-level image may also consist of complex numbers, where a complex number includes real and imaginary part.

As mentioned above, conversion of the design database (consisting of polygons or the like) to a pixel-based image(s) is performed and/or accomplished by the microprocessor subsystem of the accelerator system.

In one embodiment, anti-aliasing filtering techniques may be implemented. That is, since the anti-aliasing filtering may be implemented as a linear operation, the different phase layers may be converted to binary bitmap then to a multi-level image (for example, gray-level image) individually, then multiplied with their individual phase factor, then added up to obtain a final multi-level image (for example gray-level image) with complex pixel values. The anti-aliasing filtering techniques, in one embodiment, may be performed and/or accomplished by the accelerator system using the binary bitmap image of the polygon design database.

After the design database is converted to a gray-level image, in one embodiment, that image may be applied to processing to model the systematic mask errors into the image. For example, common mask errors include bias and corner rounding, caused by the imperfections in the mask's manufacturing process, for example, ebeam proximity effect and resist development. Corner rounding refers to the fact that corners on mask are not sharp but rounded (caused by, for example, the finite size of writing beam spot, and the resist development low-pass effect), and can be modeled by introducing an edge rounding effect for all corners, for example, using a quarter of a circle to replace the sharp 90 degree intersection of two straight edges.

Bias refers to the difference between the actual linewidth and the design value (which may be caused by, for example, the resist over-development or under-development). Notably, that difference may depend on the designed linewidth value and neighboring patterns (caused by, for example, ebeam proximity effect). Bias can often be modeled by a gray-level morphological operation on the image, with a dilation or erosion value that depends on the pattern's size and pattern's neighborhood to account for the proximity effect. These techniques are well known to those skilled in image processing.

Notably, the mask error modeling function may be optional. For example, in those instances where the masks are made with high quality techniques, the final effect on wafer due to mask error may be negligible. Accordingly, this mask error modeling need not be implemented.

Further, the mask error modeling function, in one embodiment, may be performed and/or accomplished by the accelerator subsystem of the accelerator system using, for example, the bitmap image of the polygon design database, as described above.

The next process is to model the aerial imaging path through the projection optics and under the designed illumination scheme. The physical imaging model has been well established in optical science, either scalar or vector imaging model may be used. Vector model is becoming more important as the optical lithography moves to high-NA systems (high NA generally refers to NA larger than 0.6). Over the past decade, there have been various techniques developed to speed up the computation.

One example is to decompose the total imaging system into a series of coherent imaging systems with decreasing importance, i.e., smaller and smaller eigenvalues of a matrix called Transmission Cross Coefficients (TCC) which is a matrix defined by the projection and illumination optics but independent of the mask pattern itself. The decomposed coherent systems are often called as eigen-systems. Depending on the accuracy requirement, various numbers of eigen-systems can be included. The majority of the aerial image computations may employ Fast Fourier Transforms (FFTs), both forward and backward, to generate the aerial image. Because a diffraction-limited coherent optical imaging system may be readily characterized as a series of Fourier Transforms, it may be advantageous to employ FFTs to generate the aerial image of the design. All these transforms, when applied on pixel based image, may be regular pixel-based computations.

Further, the aerial image generation, in one embodiment, may be performed and/or accomplished by the accelerator subsystem using, for example, the bitmap image of the polygon design database as modified by additional processing (for example, anti-aliasing filtering techniques and/or mask error modeling), if any.

During the aerial image generation/computation, the wafer-surface resist stack parameters (for example, thickness, bottom anti-reflective coating (BARC) and/or refractive index) may be incorporated into the TCC equations. Various non-mask RET technologies may also be incorporated, for example, the off-axis illumination and pupil filtering, as part of the TCC computation equations. Further, the imperfections in optics, for example, aberration and/or light scattering, may also be incorporated in the aerial imaging equations, by accordingly modifying the pupil filtering from ideal case.

The aerial image in the resist is responsible for exposing the resist itself. For a rigorous first-principle modeling (i.e., resist simulation), a 3D intensity distribution of the aerial image inside the resist may be employed. For certain embodiments of resist modeling, a 2D aerial image distribution on one plane may be employed, for example, the aerial image at a certain distance above the wafer surface. With the computed aerial image, many different resist models may be applied. A resist model simulates and/or models the physical and chemical processes and predicts the final developed resist edge location, and/or resist profile. Notably, all such models and modeling techniques, whether now known or later developed, are intended to be within the scope of the disclosure herein.

In one embodiment, the edge locations and/or edge profile may be compared with experimental results, for example, SEM image, CD values measured by metrology tools (for example, CD-SEM, optical CD tools), to verify and calibrate the resist model parameters.

Notably, the resist modeling may be reduced to regular pixel-based computation, for example, filtering, re-mapping, and hence is suitable for hardware acceleration. As such, the resist modeling or simulation, in one embodiment, may be performed and/or accomplished by the accelerator subsystem using, for example, the binary bitmap image of the polygon design database directly, or using the bitmap image of the polygon design database as modified by additional processing (for example, anti-aliasing filtering techniques and/or mask error modeling), or directly to the aerial image generated thereby.

The next operation is the modeling of the substrate etching process. This operation is optional and often unnecessary in current lithography simulation and/or analysis, since the etching process may be considered as a separate and independent process from lithography. However, the etch process may be incorporated into the analysis.

Simulation of substrate etching processes may also be reduced to pixel-based processing. As such, the etch process simulation, in one embodiment, may be performed and/or accomplished by the accelerator subsystem using, for example, the binary bitmap image of the polygon design database directly, or using the bitmap image of the polygon design database as modified by additional processing (for example, anti-aliasing filtering techniques, mask error modeling, and/or resist simulation), or directly to the aerial image generated thereby.

After determination and/or identification of edge locations of a design, the printed pattern on wafer may be determined, inspected, characterized and/or evaluated. By connecting the edge points identified, the simulated wafer pattern is constructed. These predicted wafer patterns may be used for various applications, for example, comparing to design-target (i.e., the desired pattern on wafer) to verify that the RET design is indeed achieving its goal and has not generated errors. A discussion of various and/or suitable applications are provided in detail below.

In one embodiment, hardware acceleration refers to the technique of using hardware (for example, electronic boards containing computing engines, communication chips and/or memories) that is more efficient for pixel-based type of computation than general purpose-type microprocessor based computing device. The accelerator hardware may be implemented with the highly configured and specifically programmed general purpose-type computing devices (for example, general purpose microprocessors and/or programmable logic devices), and, as such, offload significant computation processes from the microprocessor. In this way, the system computes simulation data in a more parallel and pipelined fashion.

For example, in one embodiment, the microprocessor subsystem of the accelerator system may handle those computations that heavily depend on case-based logic, for example, polygon conversion to bitmap representation thereof, while the accelerator subsystem of the accelerator system handles those computations that have less (or little to no) data inter-dependency. As such, in this configuration, the computational intensive tasks performed by the accelerator subsystem may be parallelized and computed in a pipelined fashion, for example, image filtering, image transformations such as a Fourier Transform and/or resist modeling/simulation.

In one embodiment, the computations that may be or are performed by one or more accelerator subsystems include, for example, anti-aliasing filtering and down-sampling, FFTs for aerial image computation, image filtering and/or thresholding operations in resist modeling. The computations that may be handled by one or more microprocessor subsystems include: polygon to binary bitmap conversation, application programs or processes (for example, RET verification through comparison, defect merging). The partitioning of computing tasks between the one or more microprocessor subsystems and the one or more accelerator subsystems is application-dependent and may vary from application to application or job to job. The optimal partitioning is to balance the computation time between the one or more accelerator subsystems and one or more microprocessor subsystems, so that neither of the two subsystems would spend much time waiting for the results from the other subsystem.

The system is capable of rapid lithography simulation, inspection, characterization and/or evaluation of the optical characteristics and/or properties, as well as the effects and/or interactions of lithographic systems and processing techniques. The system may be employed in many applications, for example, verification, inspection, characterization and/or evaluation of the lithographic designs, techniques and/or systems, and/or individual functions performed thereby or components used therein. Several of the applications are listed and described below. It should be noted that this list of applications is not exhaustive. Indeed, the system may be used in all the applications that depend on lithography simulation, inspection, characterization and/or evaluation of a semiconductor design and/or manufacturing, and as such all applications, whether now known or later developed, are intended to be within the scope of this disclosure.

In one application, the system may be implemented for fast RET verification, inspection and/or characterization.

RET verification may refer to the procedure that uses detailed simulation of the entire lithography process to verify that the RET design achieves the desired, anticipated and/or acceptable results in the final wafer pattern. The desired, anticipated and/or acceptable results on wafer are usually part of the design database, sometimes referred to as reference layer or design-target layer. The post-RET design database is also part of the design database. After obtaining the simulated wafer pattern using the post-RET design database, the wafer pattern may be compared with the reference layer, and deviations may then be highlighted, characterized and/or analyzed.

Further, interlayer characterization and/or analysis may be employed to determine the overlay margin. For example, the overlay between contact and poly layer is critical in IC manufacturing. Too little or small overlay may cause a lower chip yield. The system and techniques described herein may be employed to analyze the amount of overlay margin between two related or unrelated layers, for example, by comparing their correspondingly simulated wafer resist pattern. Notably, places or locations where the margin is too small may be highlighted to, for example, analyze in greater detail.

The speed of simulation and/or characterization of RET designs as described herein enables RET verification to be conducted at one, some or all of the different points in the process window (i.e., the acceptable lithography process variation in focus and exposure dose). While the RET design may be acceptable at certain or given points in the process window (a combination of a dose and a focus), it may produce too large of a deviation at other points in the process window. As such, a more thorough and exhaustive RET design verification includes analysis and/or simulation of all the points in the lithography process window.

Notably, the system and techniques described herein may generalize the process window to include many other process parameters beyond focus and dose, for example, illuminations, mask errors, stepper aberrations and/or resist thickness. In this situation, the process window becomes a volume in a hyper-dimensional space.

Besides the edge placement, line-end placement, line break/bridging, CD errors, and/or any other errors that are determined by the on-wafer edge locations, the system and techniques described herein may be employed to analyze the wafer pattern's printing sensitivity to process variation, for example, mask error, focus, dose, numerical aperture, illumination aperture, aberration, or other process parameters. The printing sensitivity refers to the derivative of the wafer pattern error vs. the process parameter change. The analysis can be achieved by introducing a small change in the process parameters, and analyze the resulting wafer pattern characteristics. The higher the sensitivity, the worse the design's robustness is.

For example, in the context of CD sensitivity, the system and techniques described herein may be employed to analyze the following derivatives as CD's sensitivity to those corresponding process parameters:

dCD_on_wafer/dCD_error_on_mask, where "d" is referring to derivative. This specific sensitivity is the derivative of the "CD_on_wafer" vs. "CD_error_on_mask", i.e., for a unit amount of change in "CD_error_on_mask", the amount of change in "CD_on_wafer". This sensitivity is often called MEEF, i.e., Mask Error Enhancement Factor. Two sub-cases can be used: Global mask error MEEF. In this case, all patterns on mask are biased at the same time. This sensitivity relates to mask bias variation across the mask. Local mask error MEEF. In this case, only a single local pattern on mask is assumed to have CD error. This sensitivity relates to a mask defect.

dCD/dFocus_of_stepper, i.e., on-wafer CD's sensitivity vs. stepper focus.

dCD/dDose_of_stepper, i.e., on-wafer CD's sensitivity vs. stepper's exposure dose.

dCD/dAberration_of_stepper, i.e., on-wafer CD's sensitivity vs. stepper's aberration.

dCD/dIllumination_pupil_of_stepper, i.e., on-wafer CD's sensitivity vs. stepper's illumination pupil (e.g., its size and shape, and the illumination distribution within the pupil).

dCD/dNA_of_stepper, i.e., on-wafer CD's sensitivity vs. stepper's numerical aperture.

dCD/dThickness_of_resist, i.e., on-wafer CD's sensitivity vs. the resist thickness on wafer.

dCD/dRefractive_index_of_resist, i.e., on-wafer CD's sensitivity vs. the resist's refractive index on wafer.

dCD/dResist_stack, i.e., on-wafer CD's sensitivity vs. the resist stack's parameters (e.g., thickness of BARC).

dCD/dFlare_of_stepper, on-wafer CD's sensitivity vs. the stepper's flare amount.

dCD/dResist_processing_parameters, i.e., on-wafer CD's sensitivity vs. the resist processing parameters (e.g., for example, resist baking time, resist development time).

The above sensitivity values may be referred to as Design-for-Manufacturability, or DFM, metrics. The system and techniques described herein may employ the DFM metrics to perform process sensitivity inspection, and determine the process weak points in design. That is, the system and techniques described herein may be employed to identify design locations that have the sensitivity over a certain threshold. Additional functions in this DFM metric analysis may include:

ANOVA analysis (which is a standard technique in statistical analysis of experimental results) to identify key sensitivity contributing factors and interaction between the factors;

Complete process window determination beyond Dose-Focus window;

Identify the design locations that limit the process window; and/or

Give recommendations of design modifications that enhance the process window.

It should be noted that all of the above analysis and verification/inspection may be conducted for the unique or generic characteristics of a specific or particular stepper or scanner. For example, a wafer fabrication facility may have a plurality of the same or different steppers; each stepper includes own "signature" of aberrations or characteristics. As such, the set of aberrations or characteristics may be incorporated into the simulation process (for example, during the aerial image generation) to analyze the design's suitability for that individual stepper. Simulation for multiple steppers may also be used to select the best stepper(s) for the specific design.

It should also be noted that the RET verification, the multi-process-point analysis, the process-sensitivity analysis, and all other analysis mentioned above, may be applied to either full chip design, or in a localized region, depending on user need. Localized region may be particularly useful for interactive analysis and review. For example, the circuit designer may use the localized area analysis to fine-tune a design of small area libraries, or to fine-tune the small area design before the full chip design is complete.

The fast simulation may also be used in optimization of lithography settings, for example, searching for enhanced and/or the optimal (i) illumination and NA settings, (ii) resist processing parameters (for example, baking time, development time), and (iii) resist stack design (for example, resist thickness, BARC layer structure).

In fact, the fast simulation may be used in or during the RET design itself, i.e., searching for enhanced and/or the optimal RET decoration that provides or produces the enhanced results on wafer patterning, in terms of, for example, edge displacement, as compared to desired pattern on wafer. The RET design may also at the same time optimize process window size and the DFM metrics. During RET verification and/or inspection, this design capability may also be used to produce recommended modification to RET design at defective design locations.

Further, the system and techniques described herein may be employed to co-optimize or co-enhance the RET decoration and the lithography settings. For example, the OPC design may be co-optimized with illumination methodology. By selecting appropriate illumination together with the OPC design (i.e., optimizing the illumination and OPC design simultaneously), the system and techniques described herein may simplify the OPC decoration without sacrificing the final patterning quality and robustness. Notably, this approach may reduce the mask making complexity and hence reduce the mask cost.

The system and techniques described herein may also be employed to enhance and/or optimize implementation of other RET technologies, for example, multiple-exposure. Multiple-exposure refers to the technique of breaking up the patterns into multiple exposing passes, so that each exposure only prints part of the pattern with reduced interaction between the patterns (due to, for example, the increased distance between the patterns). One existing technique called "double exposure" breaks the patterns into x- and y-oriented patterns, and employs x- and y-dipole illumination for them, respectively. Assuming two exposures or a fixed number of exposures, the optimal decomposition may not be as simple as an x- and y-separation, but may depend on the circuit pattern itself. The system and techniques described herein may be employed to search and analyze the optimal decomposition of the chip pattern for multiple exposures. For example, all exposures may employ the same illumination, or the illumination may be different for each exposure in order to enhance and/or optimize the process.

The illumination-decomposition co-optimization may further improve lithography quality and robustness. Further, optimization can include co-optimization together with other lithography parameters, for example, OPC design, NA, pupil filtering. Notably, all these optimization and co-optimization may be enhanced using the system and techniques herein.

Further, the system, when equipped with the process parameters used in a semiconductor foundry, can serve as the "ambassador" from foundry to its chip design customers. That is, the system encapsulates the critical process and tool information, and used by foundry's chip design customers to assess, measure, and optimize their designs for their specific foundry partner, without directly accessing their foundries' proprietary process details.

Moreover, the system and techniques may feed-forward its simulation results to metrology tools. That is, the system's results are provided to different metrology and inspection tools in the mask shop and wafer fabrication facility. For instance, it may be useful to define "context-sensitive" mask design and manufacturing, for example, insensitive areas can have relaxed inspection tolerances. It may also help to focus the existing metrology and inspection resources in the wafer fabrication facility so that they concentrate on the "marginal areas", for example, physical RET-design-inspection using metrology tools for those RET weak points identified in multi-process window inspection and process sensitivity inspection.

The system and techniques may be combined with a conventional mask inspection system (for example, TeraScan DUV Reticle Inspection System from KLA-Tencor Corporation of San Jose, Calif., USA), to conduct real-time simulated wafer pattern inspection. For example, conventional lithographic and/or mask inspection systems capture high-resolution image(s) of a mask. The captured, high-resolution images may have a higher resolution for mask patterns than the mask pattern's aerial image printed on wafer; as such, the conventional lithographic and/or mask inspection systems may provide more data, details and/or information regarding the pattern disposed on the mask. These high-resolution images may be provided to the system to simulate, analyze and/or characterize the predicted wafer pattern either in resist and/or after substrate etching, which is in turn compared with the desired circuit pattern on wafer. When there is deviation, a defect may be identified. Doing so not only verifies that the mask is fabricated according to a desired post-RET design, but also verifies that the realization of the RET design on mask will create the desired results on wafer. This inspection mode is different from current mask inspection industry's practices of D:D or D:DB inspection, since this inspection mode compares a simulated on-wafer in-resist or after-etch pattern to the design target, therefore realizing a Die-To-Target (D:T) inspection mode.

D:T inspection mode need not use the post-RET design database. Instead, the D:T inspection mode may use the high-resolution image captured by the mask inspection tool as the post-RET data to simulate the in-resist or after-etch image or pattern on wafer. A D:T inspection technique may then employ the simulated in-resist or after-etch pattern to compare to the design's on-wafer target pattern.

The D:T inspection mode is a highly dynamic-per-pixel-printability inspection method for masks because it only captures the defects that affect the printed wafer circuit pattern, and does not report those defects that do not change the wafer circuit pattern, which are known as nuisance defects (i.e., defects that do not affect chip yield). By eliminating the nuisance defects, D:T inspection may reduce un-necessary mask "scraps", improve mask yield, and/or reduce mask cost. D:T may also capture, detect and/or identify mask defects that are "below" the detection threshold of D:D or D:DB inspection but affect the wafer circuit pattern when combined with lithography optics (of, for example, a stepper or scanner) and the wafer resist processing, thereby reducing the possibility of wafer yield loss.

Notably, the D:T inspection technique may be integrated and/or combined with D:DB inspection techniques, to identify additional, false and/or undetected defects in the RET design. For example, where the D:T inspection technique detects and/or identifies a significant defect, but D:DB inspection technique does not detect and/or identify that defect or defective area on mask (i.e., the mask is just as designed according to the post-RET database), it is likely that the RET design at the defective area includes or is in error (i.e., the design cannot produce the desired wafer pattern even though the mask is made according to that design).

In another aspect, D:T inspection may also improve the inspectability of masks. The small and complex OPC features make traditional D:D or D:DB inspection very challenged. Many small OPC feature may be flagged as "defect"

(i.e., false defect), reducing the inspectability and hence creating constraints in OPC design. With D:T inspection, the high-resolution image is directly used to simulate the on-wafer in-resist or after-etch pattern, where all small OPC features have been filtered out. The comparison to design target no longer involves small OPC features and hence the false defect rate may be reduced.

In another embodiment of a mask inspection technique, certain systems, devices and/or techniques to measure an aerial image inside the lithographic equipment may be employed, in conjunction with the system and techniques described herein, to measure, inspect, characterize and/or evaluate optical lithographic equipment, methods, and/or sub-systems related thereto (for example, the optical sub-systems and control systems of the equipment as well as photomasks used therewith). In this regard, the aerial image(s) sampled and/or collected may be provided to the system described herein to compare with the simulated and/or predicted wafer pattern. In this mode, the system provides the simulated aerial image using the post-RET database and the optical settings of the lithographic equipment (notably, the resist development and substrate etch simulations are omitted if only aerial image is needed), and another system and technique provides the actual aerial image captured from inside the lithographic equipment. This may be done on a pixel-by-pixel basis to identify deviations/defects therebetween.

In particular, this mask inspection technique detects or identifies defects in a lithographic design using a simulated lithographic design and a measured aerial image of the lithographic design. The method includes generating a pixel-based bitmap representation of the lithographic design, wherein the pixel-based bitmap includes pixel data, and each pixel datum represents a pixel having a predetermined pixel size (as described above). The method generates a simulated aerial image of the lithographic design using the pixel-based bitmap representation of the lithographic design.

The method further includes measuring image data to generate a measured aerial image of the lithographic design wherein the measured aerial image is a pixel-based bitmap representation of the lithographic design produced by a lithographic tool at a wafer plane. Thereafter, the method compares the measured aerial image of the lithographic design and the simulated aerial image of the lithographic design to detect potential errors in the lithographic design. Moreover, the method may also compare the simulated aerial image of the lithographic design to a desired, predetermined pattern contained in a database.

As described above, the pixel-based bitmap representation of the lithographic design may include converting a plurality of polygons arranged in a predetermined configuration to a pixel-based bitmap representation thereof. The pixel-based bitmap may be a gray-level image which is representative of the plurality of polygons.

Further, the pixel size may be determined as described above. In one embodiment, the pixel size may be greater than the Nyquist frequency in the aerial image of the lithographic design and/or determined using the numerical aperture and wavelength of a projection optics of a lithographic tool.

Of course, this method may be implemented on one or more of the embodiments of the system described herein. Indeed, all of the embodiments, features and/or techniques described above with respect to the other inspection techniques may be implemented in the mask inspection technique that detects or identifies defects in a lithographic design using a simulated lithographic design and a measured aerial image of the lithographic design. For the sake of brevity, those discussions will not be repeated.

In one application, the system and techniques described herein facilitate and enable rapid verification or inspection of a RET design. This refers to the procedure that uses detailed simulation of the entire lithography process to verify, characterize and/or analyze a RET design, including with respect to the desired/anticipated results on a final wafer pattern.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method comprising:
    obtaining a plurality of kernels for adapting a mask design layout for a physical optical mask for creating a device pattern, to a mask 3D transmission;
    applying a filter in relation to the plurality of kernels and the mask design layout; and
    using, by a hardware computer system, results of the filtering and the plurality of kernels with a thin mask transmission corresponding to the mask design layout to create a mask 3D transmission corresponding to the mask design layout, wherein the mask 3D transmission, or information derived therefrom, is configured to guide manufacture of the physical optical mask for creating the device pattern.

2. The method of claim 1, wherein the kernels are independent of the layout of any particular mask.

3. The method of claim 1, wherein the filtering comprises limiting frequencies.

4. The method of claim 1, further comprising applying, by the hardware computer system, a thin mask model to the mask design layout to create the thin mask transmission.

5. The method of claim 1, further comprising applying, by the hardware computer system, at least an optical model to the mask 3D transmission, or information derived therefrom, to create an image corresponding to the mask design layout.

6. The method of claim 1, wherein the kernels are for transverse electric (TE) polarization and transverse magnetic (TM) polarization.

7. The method of claim 1, wherein obtaining the plurality of kernels further comprises:
    receiving a mask topography structure;
    performing a rigorous simulation to simulate a near-field in relation to the mask topography structure; and
    deriving the plurality of kernels from the near-field.

8. The method of claim 1, wherein the mask 3D transmission is in a spatial domain form.

9. A non-transitory computer-readable medium having instructions stored thereon which, when executed by a computer system, are configured to cause the computer system to at least:
    obtain a plurality of kernels for adapting a mask design layout for a physical optical mask for creating a device pattern, to a mask 3D transmission;
    apply a filter in relation to the plurality of kernels and the mask design layout; and
    use results of the filtering and the plurality of kernels with a thin mask transmission corresponding to the mask design layout to create a mask 3D transmission corresponding to the mask design layout, wherein the mask 3D transmission, or information derived therefrom, is configured to guide manufacture of the physical optical mask for creating the device pattern.

10. The computer-readable medium of claim 9, wherein the kernels are independent of the layout of any particular mask.

11. The computer-readable medium of claim 9, wherein the instructions configured to apply the filter are configured to limit frequencies.

12. The computer-readable medium of claim 9, wherein the instructions are further configured to apply a thin mask model to the mask design layout to create the thin mask transmission.

13. The computer-readable medium of claim 9, wherein the instructions are further configured to apply at least an optical model to the mask 3D transmission, or information derived therefrom, to create an image corresponding to the mask design layout.

14. The computer-readable medium of claim 9, wherein the kernels are for transverse electric (TE) polarization and transverse magnetic (TM) polarization.

15. The computer-readable medium of claim 9, wherein the instructions configured to obtain the plurality of kernels are further configured to:
   receive a mask topography structure;
   perform a rigorous simulation to simulate a near-field in relation to the mask topography structure; and
   derive the plurality of kernels from the near-field.

16. A non-transitory computer-readable medium having instructions stored thereon which, when executed by a computer system, are configured to cause the computer system to at least:
   apply a filtering as part of generating a plurality of kernels for adapting a mask design layout for a physical optical mask for creating a device pattern, to a mask 3D transmission; and
   apply the plurality of kernels with the mask design layout to create a mask 3D transmission corresponding to the mask design layout, wherein the mask 3D transmission, or information derived therefrom, is configured to guide manufacture of the physical optical mask for creating the device pattern.

17. The computer-readable medium of claim 16, wherein the instructions configured to apply the filtering are configured to limit frequencies.

18. The computer-readable medium of claim 16, wherein the kernels are independent of the layout of any particular mask.

19. The computer-readable medium of claim 16, wherein the kernels are for transverse electric (TE) polarization and transverse magnetic (TM) polarization.

20. The computer-readable medium of claim 16, wherein the instructions are further configured to:
   receive a mask topography structure;
   perform a rigorous simulation to simulate a near-field in relation to the mask topography structure; and
   derive the plurality of kernels from the near-field.

21. The computer-readable medium of claim 16, wherein the instructions are further configured to apply a thin mask model to the mask design layout to create a thin mask transmission for use in application of the plurality of kernels with the mask design layout to create a mask 3D transmission.

* * * * *